US012542138B2

(12) United States Patent
Nam et al.

(10) Patent No.: US 12,542,138 B2
(45) Date of Patent: Feb. 3, 2026

(54) AUDIO ENCODING APPARATUS AND METHOD, AND AUDIO DECODING APPARATUS AND METHOD

(71) Applicant: SAMSUNG ELECTRONICS CO., LTD., Suwon-si (KR)

(72) Inventors: Woohyun Nam, Suwon-si (KR); Yoonjae Son, Suwon-si (KR); Hyunkwon Chung, Suwon-si (KR); Sunghee Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 243 days.

(21) Appl. No.: 18/127,374

(22) Filed: Mar. 28, 2023

(65) Prior Publication Data

US 2023/0238003 A1 Jul. 27, 2023

Related U.S. Application Data

(63) Continuation of application No. PCT/KR2021/013071, filed on Sep. 24, 2021.

(30) Foreign Application Priority Data

Sep. 28, 2020 (KR) ........................ 10-2020-0126360
Dec. 21, 2020 (KR) ........................ 10-2020-0179918

(51) Int. Cl.
*G10L 19/008* (2013.01)

(52) U.S. Cl.
CPC .................................. *G10L 19/008* (2013.01)

(58) Field of Classification Search
CPC ..................................................... G10L 19/008
See application file for complete search history.

(56) References Cited

U.S. PATENT DOCUMENTS 6,807,528 B1 10/2004 Truman et al.
8,041,041 B1 10/2011 Luo et al.
(Continued)

FOREIGN PATENT DOCUMENTS

CN 110853658 A 2/2020
JP 2017-523451 A 8/2017
(Continued)

OTHER PUBLICATIONS

Huang, Qingbo, Xihong Wu, and Tianshu Qu. "A parametric spatial audio coding method based on convolutional neural networks." Audio Engineering Society Convention 145. Audio Engineering Society, 2018. (Year: 2018).*
(Continued)

*Primary Examiner* — Brian L Albertalli
(74) *Attorney, Agent, or Firm* — Sughrue Mion, PLLC

(57) ABSTRACT

An audio signal processing apparatus is configured to: transform a first audio signal includes n channels to generate a first audio data in a frequency domain, generate a frequency feature signal for each channel from the first audio data in the frequency domain, based on a first deep neural network (DNN), generate a second audio signal includes m channels from the first audio signal, based on a second DNN, and generate an output audio signal by encoding the second audio signal and the frequency feature signal. The first audio signal is a high order ambisonic signal includes a zero$^{th}$ order signal and a plurality of first order signals. The second audio signal includes a mono signal or a stereo signal. m is smaller than n.

16 Claims, 19 Drawing Sheets

(56) References Cited

U.S. PATENT DOCUMENTS

| | | | |
|---|---|---|---|
| 9,373,335 B2 | 6/2016 | Hooks et al. | |
| 9,378,743 B2 | 6/2016 | Riedmiller et al. | |
| 9,530,421 B2 | 12/2016 | Jot et al. | |
| 9,997,164 B2 | 6/2018 | France et al. | |
| 10,075,795 B2 | 9/2018 | Lee et al. | |
| 10,332,530 B2 * | 6/2019 | Kleijn | G10L 19/20 |
| 10,332,532 B2 | 6/2019 | Seo et al. | |
| 10,341,802 B2 | 7/2019 | Krueger et al. | |
| 10,552,711 B2 | 2/2020 | Lim et al. | |
| 11,024,320 B2 | 6/2021 | Samuelsson et al. | |
| 11,089,423 B2 | 8/2021 | Kim et al. | |
| 11,133,015 B2 | 9/2021 | Beack et al. | |
| 11,183,196 B2 | 11/2021 | Borss et al. | |
| 11,790,926 B2 * | 10/2023 | Lee | G10L 19/028 704/500 |
| 2008/0312912 A1 | 12/2008 | Choo et al. | |
| 2017/0164131 A1 | 6/2017 | Krueger et al. | |
| 2018/0324542 A1 | 11/2018 | Seo et al. | |
| 2019/0180142 A1 | 6/2019 | Lim et al. | |
| 2019/0180763 A1 * | 6/2019 | Beack | G10L 19/04 |
| 2020/0111501 A1 | 4/2020 | Sung et al. | |
| 2020/0221242 A1 * | 7/2020 | Kim | G10L 25/30 |
| 2021/0304777 A1 * | 9/2021 | Kim | G10L 19/002 |
| 2022/0345813 A1 * | 10/2022 | Stein | H04S 3/008 |
| 2022/0369058 A1 | 11/2022 | Lee et al. | |
| 2023/0300557 A1 * | 9/2023 | Honma | G06N 3/08 381/300 |

FOREIGN PATENT DOCUMENTS

| | | | |
|---|---|---|---|
| KR | 10-2014-0125745 | A | 10/2014 |
| KR | 10-2019-0069192 | A | 6/2019 |
| KR | 10-2019-0069198 | A | 6/2019 |
| KR | 10-2019-0072653 | A | 6/2019 |
| KR | 10-2020-0013091 | A | 2/2020 |
| KR | 10-2020-0014428 | A | 2/2020 |
| KR | 10-2020-0039530 | A | 4/2020 |
| KR | 10-2020-0086064 | A | 7/2020 |
| WO | 2020/010072 | A1 | 1/2020 |

OTHER PUBLICATIONS

Park, Su Yeon, Chan Jun Chun, and Hong Kook Kim. "Subband-based upmixing of stereo to 5.1-channel audio signals using deep neural networks." 2016 International Conference on Information and Communication Technology Convergence (ICTC). IEEE, 2016. (Year: 2016).*

Purwins, Hendrik, et al. "Deep learning for audio signal processing." IEEE Journal of Selected Topics in Signal Processing 13.2 (2019): 206-219. (Year: 2019).*

Communication dated Dec. 24, 2021, issued by the International Searching Authority in counterpart International Application No. PCT/KR2021/013071 (PCT/ISA/220, PCT/ISA/210 and PCT/ISA/237).

Bin Cheng et al., "A Spatial Squeezing Approach to Ambisonic Audio Compression", 2008 IEEE International Conference on Acoustics, Speech and Signal Processing (ICASSP), Mar. 31, 2008, pp. 369-372, XP031250565.

Communication issued on Jan. 23, 2024 by the European Patent Office for European Patent Application No. 21872961.4.

Communication issued Nov. 11, 2024 by the European Patent Office for EP Patent Application No. 21872961.4.

Communication issued on Jun. 23, 2025 by the Korean Intellectual Property Office for Korean Patent Application No. 10-2020-0179918.

Communication dated Nov. 26, 2025, issued by the China National Intellectual Property Administration in Chinese Application No. 202180066296.5.

Communication dated Nov. 6, 2025, issued by the European Patent Office in European Application No. 21872961.4.

* cited by examiner

AUDIO ENCODING APPARATUS AND METHOD, AND AUDIO DECODING APPARATUS AND METHOD

CROSS-REFERENCE TO RELATED APPLICATIONS

This application is a by-pass continuation application of International Application No. PCT/KR2021/013071, filed on Sep. 24, 2021, which is based on and claims priority to Korean Patent Applications No. 10-2020-0126360, filed on Sep. 28, 2020 and No. 10-2020-0179918, filed on Dec. 21, 2020, in the Korean Intellectual Property Office, the disclosures of which are incorporated by reference herein their entireties.

BACKGROUND

1. Field

The disclosure relates to audio encoding and decoding. More particularly, the disclosure relates to encoding and decoding audio including a plurality of channels by using artificial intelligence (AI).

2. Description of Related Art

Audio is encoded by a codec conforming to a certain compression standard, for example, the Advanced Audio Coding (AAD) standard, the OPUS standard, etc., and then, is stored in a recording medium or transmitted via a communication channel in the form of a bitstream.

In general, as a general-purpose codec does not support encoding/decoding of multi-channel audio providing a spatial three-dimensional effect to a listener, there is a demand for a method of encoding/decoding multi-channel audio at a low bitrate by using the general-purpose codec.

SUMMARY

Provided are a system and a method to encode/decode multi-channel audio by using a general-purpose codec supporting encoding/decoding of sub-channel audio.

Also, provided are a system and a method to encode multi-channel audio at a low bitrate, and to reconstruct the multi-channel audio with a high quality.

According to an aspect of the disclosure, an audio signal processing apparatus includes: a memory storing one or more instructions; and a processor operatively connected to the memory and configured to execute the one or more instructions stored in the memory. The processor is configured to: transform a first audio signal includes n channels to generate a first audio data in a frequency domain, generate a frequency feature signal for each channel from the first audio data in the frequency domain, based on a first deep neural network (DNN), generate a second audio signal includes m channels from the first audio signal, based on a second DNN, and generate an output audio signal by encoding the second audio signal and the frequency feature signal. The first audio signal is a high order ambisonic signal includes a zero$^{th}$ order signal and a plurality of first order signals. The second audio signal includes a mono signal or a stereo signal. m is smaller than n.

According to another aspect of the disclosure, an audio signal processing apparatus includes: a memory storing one or more instructions; and a processor operatively connected to the memory and configured to execute the one or more instructions stored in the memory. The processor is configured to: generate a third audio signal includes m channels and a frequency feature signal by decoding an input audio signal, generate a weight signal includes n channels from the frequency feature signal, based on a third deep neural network (DNN), and generate a fourth audio signal includes n channels by applying the weight signal to an intermediate audio signal includes n channels generated from the third audio signal via a fourth DNN. The third audio signal includes a mono signal or a stereo signal. The fourth audio signal is a high order ambisonic signal includes a zero$^{th}$ order signal and a plurality of first order signals. n is greater than m.

According to another aspect of the disclosure, a method performed by an audio signal processing apparatus, includes: transforming a first audio signal from a time domain into a first audio data in a frequency domain, the first audio signal being including n channels; obtaining a frequency feature signal by processing the first audio data in the frequency domain by using a first deep neural network (DNN); obtaining a second audio signal from the first audio signal by using a second DNN; and obtaining audio data by encoding the second audio signal and the frequency feature signal.

According to an embodiment, multi-channel audio may be encoded/decoded by using a general-purpose codec supporting encoding/decoding of sub-channel audio.

Also, according to an embodiment, multi-channel audio may be encoded at a low bitrate and may be reconstructed with a high quality.

However, effects that are obtainable from an audio encoding apparatus and method and an audio decoding apparatus and method according to an embodiment are not limited to the aforementioned effect, and other unstated effects will be clearly understood by one of ordinary skill in the art in view of descriptions below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
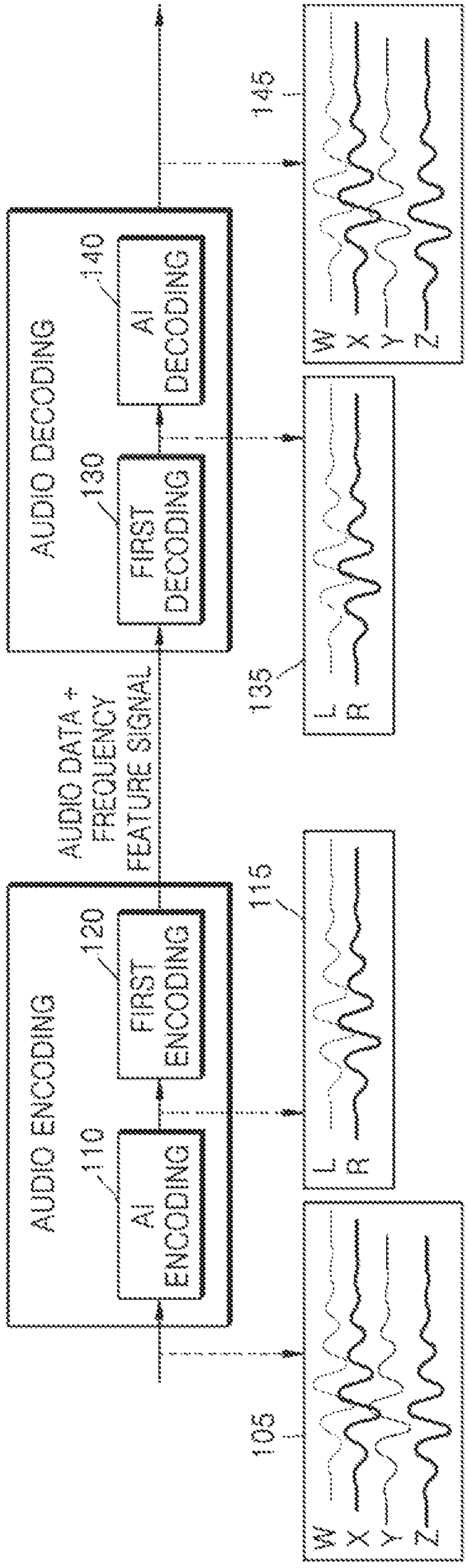
FIG. 1 illustrates a procedure for encoding and decoding audio according to an embodiment.

As the disclosure allows for various changes and numerous embodiments, particular embodiments will be illustrated in the drawings and described in detail in the written description. However, this is not intended to limit the disclosure to the particular embodiments, and it will be understood that all changes, equivalents, and substitutes that do not depart from the spirit and technical scope of the disclosure are encompassed in the embodiments of the disclosure.

In the description of embodiments, certain detailed explanations of the related art are omitted when it is deemed that they may unnecessarily obscure the essence of the disclosure. Also, numbers (for example, a first, a second, and the like) used in the description of the embodiments are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "-er (or)", "unit", or a "module", two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another element.

Also, in the present specification, a "deep neural network (DNN)" is a representative example of an artificial neural network model simulating brain nerves, and is not limited to an artificial neural network model using a specific algorithm.

Also, in the present specification, a "parameter" is used in an operation procedure of each layer forming a neural network, and for example, may include a weight used when an input value is applied to a certain operation expression. The parameter may be expressed in a matrix form. The parameter is set as a result of training, and may be updated via separate training data when necessary.

Also, in the present specification, a "first audio signal" indicates audio to be audio-encoded, and a "second audio signal" indicates audio obtained as a result of artificial intelligence (AI) encoding performed on the first audio signal. Also, a "third audio signal" indicates audio obtained via first decoding in an audio decoding procedure, and a "fourth audio signal" indicates audio obtained as a result of AI encoding performed on the third audio signal.

Also, in the present specification, a "first DNN" indicates a DNN used to obtain a frequency feature signal of a first audio signal, and a "second DNN" indicates a DNN used to AI-downscale the first audio signal. Also, a "third DNN" indicates a DNN used to obtain a weight signal from the frequency feature signal, and a "fourth DNN" indicates a DNN used to AI-upscale the third audio signal.

Also, in the present specification, "AI-downscaling" indicates AI-based processing for decreasing the number of channels of audio, and "first encoding" indicates encoding processing via an audio compression method based on frequency transformation. Also, "first decoding" indicates decoding processing via an audio reconstruction method based on frequency transformation, and "AI-upscaling" indicates AI-based processing for increasing the number of channels of audio.

Hereinafter, embodiments according to the technical concept of the disclosure will now be sequentially described.

FIG. 1 illustrates a procedure for encoding and decoding audio according to an embodiment.

As described above, due to an increase in the number of channels of an audio signal, a processing amount of information for encoding/decoding is increased, such that there is a demand for a scheme for improving efficiency in encoding and decoding of an audio signal.

As illustrated in FIG. 1, in an audio encoding procedure, a first audio signal 105 including a plurality of channels is AI-encoded (AI Encoding 110) to obtain a second audio signal 115 including a small number of channels. The first audio signal 105 may be ambisonic audio including a W channel, an X channel, a Y channel, and a Z channel, and the second audio signal 115 may be stereo-audio including a left (L) channel and a right (R) channel or mono-audio including 1 channel. In an embodiment, the first audio signal 105 may be 5-channel audio, 6-channel audio, 9-channel audio, or the like, which has channels more than 1 channel. In the disclosure, au audio signal such as the first audio signal 105 and a fourth audio signal 145, which has a large number of channels, may be referred to as a multi-channel audio signal, and an audio signal such as the second audio signal 115 and a third audio signal 135, which has a small number of channels, may be referred to as a sub-channel audio signal. The number of channels of the sub-channel audio signal may be smaller than the number of channels included in the multi-channel audio signal.

In the disclosure, first encoding 120 and first decoding 130 are performed on the second audio signal 115 having a small number of channels compared to the first audio signal 105, such that encoding/decoding of the first audio signal 105 is possible even by using a codec not supporting encoding/decoding of the multi-channel audio signal.

Describing in detail with reference to FIG. 1, in an audio encoding procedure, the first audio signal 105 including n channels is AI-encoded (AI Encoding 110) to obtain the second audio signal 115 including m channels, and the second audio signal 115 is first encoded (First Encoding 120). In an embodiment, n and m are natural numbers, where m is smaller than n. In another embodiment, n and m may be rational numbers.

In an audio decoding procedure, audio data obtained as a result of the AI-encoding (110) is received, the third audio signal 135 with m channels is obtained via first decoding 130, and the fourth audio signal 145 with n channels is obtained by AI-decoding 140 the third audio signal 135.

In a procedure of AI-encoding 110, when the first audio signal 105 is input, the first audio signal 105 is AI-downscaled to obtain the second audio signal 115 with few channels. In a procedure of AI-decoding 140, when the third audio signal 135 is input, the third audio signal 135 is AI-upscaled to obtain the fourth audio signal 145. That is, as the number of channels of the first audio signal 105 is decreased via AI-encoding 110 and the number of channels of the third audio signal 135 is increased via AI-decoding 140, there is a need to minimize a difference between the first audio signal 105 and the fourth audio signal 145 due to a change in the number of channels.

In an embodiment of the disclosure, a frequency feature signal is used to compensate for the change in the number of channels which occurs in the procedure of AI-encoding 110 and the procedure of AI-decoding 140. The frequency feature signal represents a correlation between channels of the first audio signal 105, and in the procedure of AI-decoding 140, the fourth audio signal 145 being equal/similar to the first audio signal 105 may be reconstructed based on the frequency feature signal.

AI for AI-encoding 110 and AI-decoding 140 may be implemented as a DNN. As will be described below with reference to FIG. 12, DNNs for AI-encoding 110 and AI-decoding 140 are jointly trained via sharing of loss information, a difference between the first audio signal 105 and the fourth audio signal 145 may be minimized.

Describing in detail first encoding 120 and first decoding 130 shown in FIG. 1, an information amount of the second audio signal 115 AI-downscaled from the first audio signal 105 may be decreased via first encoding 120. First encoding 120 may include a procedure for transforming the second audio signal 115 into a frequency domain, a procedure for quantizing a signal that has been transformed into the frequency domain, a procedure for entropy-encoding the quantized signal, and the like. The procedure of first encoding 120 may be implemented by using one of audio signal compression methods based on frequency transformation using the Advanced Audio Coding (AAD) standard, the OPUS standard, etc.

The third audio signal 135 corresponding to the second audio signal 115 may be reconstructed via first decoding 130 of the audio data. First decoding 130 may include a procedure for generating a quantized signal by entropy-decoding the audio data, a procedure for inverse-quantizing the quantized signal, and a procedure for transforming a signal of a frequency domain into a signal of a time domain. The procedure of first decoding 130 may be implemented by using one of audio signal reconstruction methods corresponding to the audio signal compression methods which are based on frequency transformation using the AAC standard, the OPUS standard, etc. and are used in the procedure of first encoding 120.

The audio data obtained via the audio encoding procedure may include the frequency feature signal. As described above, the frequency feature signal is used to reconstruct the fourth audio signal 145 that is equal/similar to the first audio signal 105.

The audio data may be transmitted in the form of a bitstream. The audio data may include data obtained based on sample values in the second audio signal 115, e.g., quantized sample values of the second audio signal 115. Also, the audio data may include a plurality of pieces of information used in the procedure of first encoding 120, for example, prediction mode information, quantization parameter information, or the like. The audio data may be generated according to a rule, for example, syntax, of an audio signal compression method that is used from among the audio signal compression methods based on frequency transformation using the AAD standard, the OPUS standard, etc.

Figure 2:
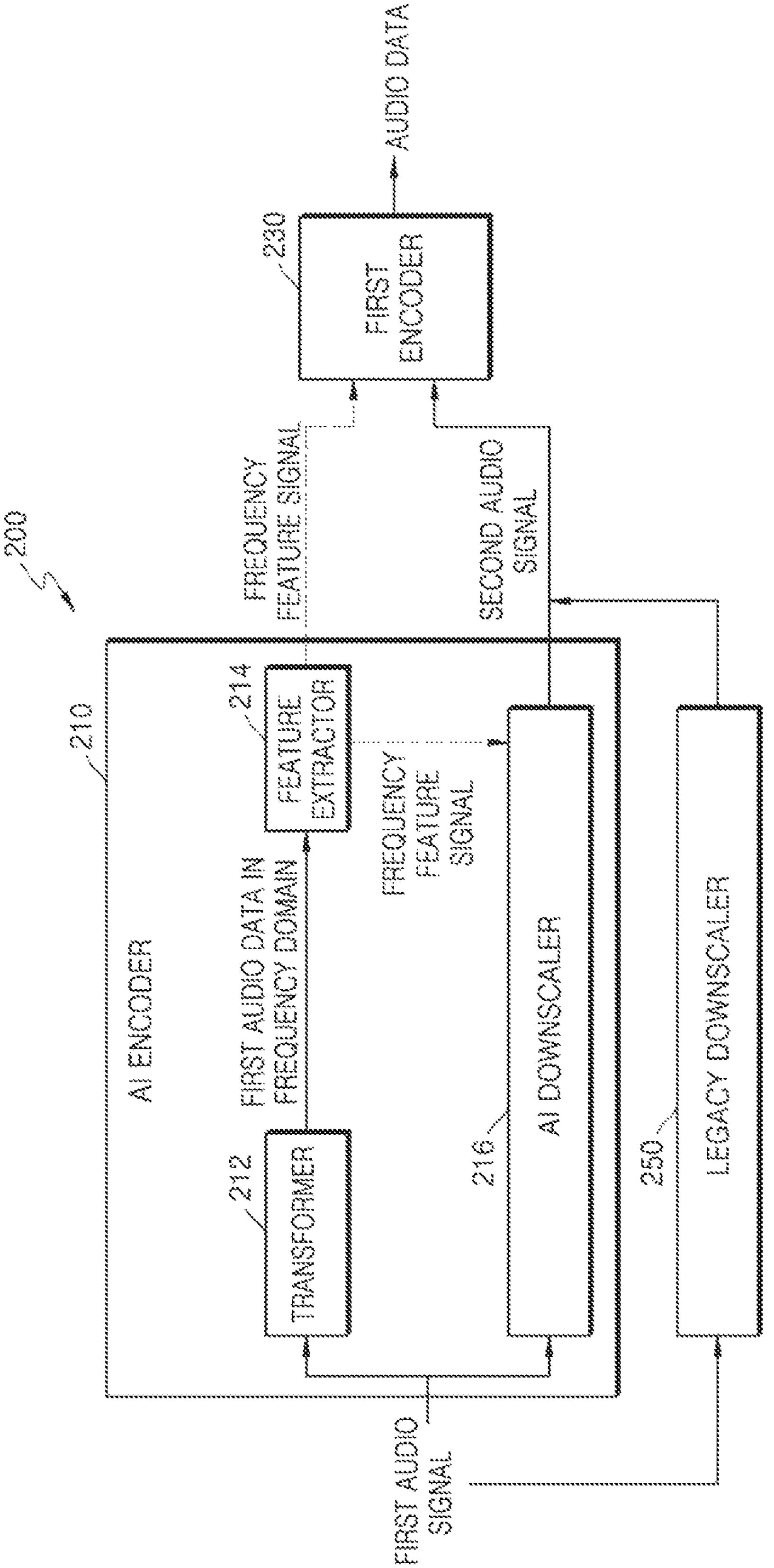
FIG. 2 illustrates a block diagram of a configuration of an audio encoding apparatus according to an embodiment.

FIG. 2 illustrates a block diagram of a configuration of an encoding apparatus 200 (or an audio encoding apparatus) according to an embodiment.

Referring to FIG. 2, the encoding apparatus 200 according to an embodiment may include an AI encoder 210 and a first encoder 230. The AI encoder 210 may include a transformer 212, a feature extractor 214 and an AI downscaler 216. As illustrated in FIG. 2, the encoding apparatus 200 according to an embodiment may further include a legacy downscaler 250.

While FIG. 2 illustrates the AI encoder 210, the first encoder 230, and the legacy downscaler 250 as individual elements, the AI encoder 210, the first encoder 230, and the legacy downscaler 250 may be implemented by one processor. In this case, they may be implemented as a dedicated processor or may be implemented as a combination of software and a general-purpose processor, such as an application processor (AP), a central processing unit (CPU), or a graphics processing unit (GPU). The dedicated processor may include a memory for implementing an embodiment of the disclosure or may include a memory processor for using an external memory.

The AI encoder 210, the first encoder 230, and the legacy downscaler 250 may be configured by a plurality of processors. In this case, they may be implemented as a combination of dedicated processors or a combination of software and a plurality of general-purpose processors such as AP, CPU or GPU. The transformer 212, the feature extractor 214 and the AI downscaler 216 may be implemented by different processors.

The AI encoder 210 obtains a frequency feature signal and the second audio signal 115 including m channels from the first audio signal 105 including n channels. In an embodiment, n and m are natural numbers, where m is smaller than n. In another embodiment, n and m may be rational numbers.

The first audio signal 105 may be a high order ambisonic signal including n channels. In more detail, the first audio signal 105 may be a high order ambisonic signal including a zero$^{th}$ order signal and a plurality of first order signals. The high order ambisonic signal will now be described with reference to FIG. 3.

Figure 3:
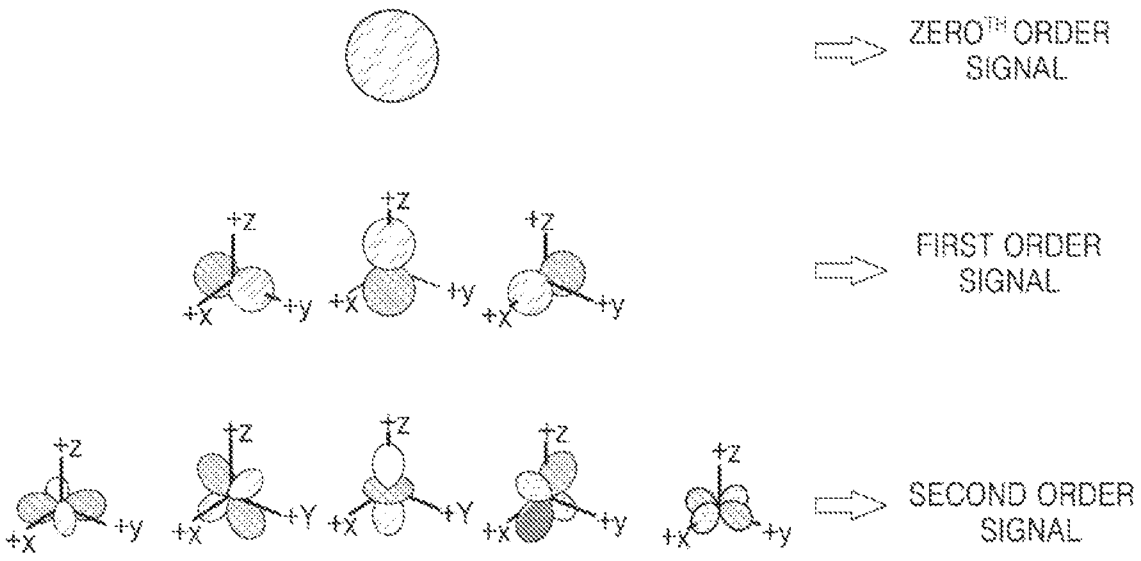
FIG. 3 illustrates an example of signals included in a high order ambisonic signal.

FIG. 3 illustrates an example of signals included in a high order ambisonic signal.

The high order ambisonic signal may include a zero$^{th}$ order signal corresponding to a W channel, a first order signal corresponding to an X channel, a Y channel, and a Z channel, and a second order signal corresponding to an R channel, an S channel, or the like. Although not illustrated in FIG. 3, the high order ambisonic signal may further include a third order signal, a fourth order signal, or the like.

In an embodiment, the first audio signal 105 may include the zero$^{th}$ order signal corresponding to the W channel, and a signal (e.g., first order signals corresponding to the X channel, the Y channel, and the Z channel) that is a higher order signal than the zero$^{th}$ order signal. In an embodiment, the first audio signal 105 may include a first order signal and signals that are higher order signals than the first order signal.

In an embodiment, the second audio signal 115 may be one of a stereo signal and a mono signal.

Referring back to FIG. 2, the second audio signal 115 may be output to the first encoder 230, and the frequency feature signal may be output from the feature extractor 214 to the AI downscaler 216 or to the first encoder 230.

The AI encoder 210 may obtain the frequency feature signal and the second audio signal 115, based on AI. Here, the AI may indicate processing by a DNN. In detail, the AI encoder 210 may obtain the frequency feature signal by using a first DNN, and may obtain the second audio signal 115 by using a second DNN.

The AI encoder 210 performs AI-downscaling for decreasing the number of channels of the first audio signal 105, and obtains the frequency feature signal indicating a feature of each channel of the first audio signal 105. The second audio signal 115 and the frequency feature signal may be signaled to a decoding apparatus 900 (or an audio decoding apparatus) via predetermined processing, and the decoding apparatus 900 may reconstruct, by using the frequency feature signal, the fourth audio signal 145 being equal/similar to the first audio signal 105.

Describing in detail the AI encoder 210, the transformer 212 transforms the first audio signal 105 from a time domain into a frequency domain, and thus, obtains a first audio data in the frequency domain. The transformer 212 may transform the first audio signal 105 into the first audio data in the frequency domain, according to various transformation methods including a short time Fourier transform (STFT), or the like. The first audio signal 105 could be referred as the first audio signal 105 in a time domain, and the first audio data in the frequency domain could be referred as a first audio signal in the frequency domain.

The first audio signal 105 includes samples identified according to a channel and a time, and the first audio data in the frequency domain includes samples identified according to a channel, a time, and a frequency bin. Here, the frequency bin indicates a frequency index indicating to which frequency (or frequency band) a value of each sample corresponds.

The feature extractor 214 obtains the frequency feature signal from the first audio data in the frequency domain via the first DNN. As described above, the frequency feature signal indicates a correlation between the channels of the first audio signal 105, and the decoding apparatus 900 to be described below may obtain, by using the frequency feature signal, the fourth audio signal 145 being equal/similar to the first audio signal 105.

The feature extractor 214 obtains the frequency feature signal having a smaller number of samples than the first audio data in the frequency domain. The reason of obtaining the frequency feature signal is to compensate for a signal loss due to the change in the number of channels according to AI-downscaling, to facilitate encoding by the first encoder 230, and to decrease the number of bits of audio data. The correlation between the channels of the first audio signal 105 may be detected from the first audio data in the frequency domain, but because the first audio data in the frequency domain has n channels as the first audio signal 105, the first audio data in the frequency domain is not to be first encoded but increases, due to its large size, the number of bits of the audio data. Therefore, the feature extractor 214 according to an embodiment may obtain the frequency feature signal having a smaller number of samples than the first audio data in the frequency domain, and thus, may simultaneously decrease the number of bits of the audio data and signal the correlation between the channels of the first audio signal 105 to the decoding apparatus 900.

The AI downscaler 216 obtains the second audio signal 115 by processing the first audio signal 105 via the second DNN. The number of channels of the second audio signal 115 may be smaller than the number of channels of the first audio signal 105. As described above, the first encoder 230 does not support encoding of the first audio signal 105 but may support encoding of the second audio signal 115.

In an embodiment, the first audio signal 105 may be 4-channel ambisonic audio, and the second audio signal 115 may be stereo audio, but the number of channels of the first audio signal 105 and the second audio signal 115 is not limited to 4 channels and 2 channels, respectively.

When the frequency feature signal obtained by the feature extractor 214 is output to the AI downscaler 216, the AI downscaler 216 embeds the frequency feature signal during the first audio signal 105 being processed via the second DNN. A procedure for embedding the frequency feature signal will be described below with reference to FIGS. 6 to 8.

The first encoder 230 may first encode the second audio signal 115 output from the AI downscaler 216, and thus, may decrease an information amount of the second audio signal 115. As a result of the first encoding by the first encoder 230, audio data may be obtained. The audio data may be represented in the form of a bitstream, and may be transmitted to the decoding apparatus 900 via a network. The audio data may be referenced as an output audio signal.

When the frequency feature signal is output from the feature extractor 214 to the first encoder 230, the first encoder 230 first encodes the frequency feature signal with the second audio signal 115. In an embodiment, the frequency feature signal may have n channels as the first audio signal 105, and thus, may be included in a supplemental region of a bitstream which corresponds to the audio data, instead of an encoding method based on frequency transformation. For example, the frequency feature signal may be included in a payload region or a user-defined region of the audio data.

As illustrated in FIG. 2, the encoding apparatus 200 may further include the legacy downscaler 250, and the legacy downscaler 250 obtains a sub-channel audio signal by downscaling the first audio signal 105. For example, the sub-channel audio signal may have m channels, as the second audio signal 115.

The sub-channel audio signal may be combined to an audio signal output from the AI downscaler 216, and the second audio signal 115 obtained as a result of the combination may be input to the first encoder 230.

In an embodiment, the legacy downscaler 250 may obtain the sub-channel audio signal by using at least one algorithm from among various algorithms for decreasing the number of channels of the first audio signal 105.

For example, when the first audio signal 105 is 4-channel audio including a W channel signal, an X channel signal, a Y channel signal, and a Z channel signal, two or more signals from among the W channel signal, the X channel signal, the Y channel signal, and the Z channel signal may be combined to obtain the sub-channel audio signal. Here, the W channel signal may indicate a sum of strengths of sound sources in all directions, the X channel signal may indicate a difference between strengths of front and rear sound sources, the Y channel signal may indicate a difference between strengths of left and right sound sources, and the Z channel signal may indicate a difference between strengths of up and down sound sources. When the second audio signal 115 is stereo audio, the legacy downscaler 250 may obtain, as a left (L) signal, a signal obtained by subtracting the Y channel signal from the W channel signal, and may obtain, as a right (R) signal, a signal obtained by summing the W channel signal and the Y channel signal. As another example, the legacy downscaler 250 may obtain the sub-channel audio signal via UHJ encoding.

The sub-channel audio signal corresponds to a prediction version of the second audio signal 115, and the audio signal output from the AI downscaler 216 corresponds to a residual version of the second audio signal 115. That is, the sub-channel audio signal corresponding to the prediction version of the second audio signal 115 is combined in the form of skip connection with the audio signal output from the AI downscaler 216, such that the number of layers of the second DNN may be decreased.

Hereinafter, the first DNN for extracting a frequency feature signal and the second DNN for AI-downscaling the first audio signal 105 will be described with reference to FIGS. 4 to 8.

Figure 4:
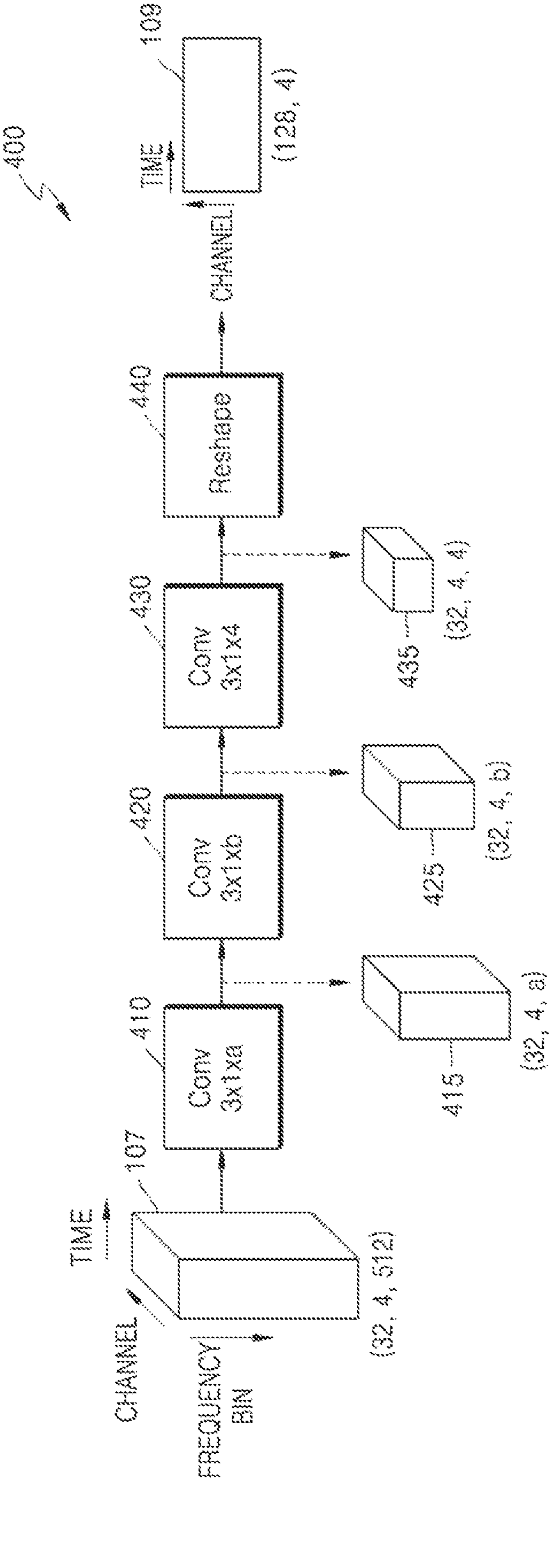
FIG. 4 illustrates a first deep neural network (DNN) according to an embodiment.

FIG. 4 illustrates a first DNN 400 according to an embodiment.

The first DNN 400 may include at least one convolution layer and at least one reshape layer.

The convolution layer obtains feature data by processing input data via a filter with a predetermined size. Parameters of the filter of the convolution layer may be optimized via a training procedure to be described below.

The reshape layer changes a size of input data by changing locations of samples of the input data.

Referring to FIG. 4, a first audio signal 107 of a frequency domain is input to the first DNN 400. The first audio signal 107 of the frequency domain includes samples identified according to a channel, a time, and a frequency bin. That is, the first audio signal 107 of the frequency domain may be three-dimensional data of the samples. Each sample of the first audio signal 107 of the frequency domain may be a frequency coefficient obtained as a result of frequency transformation.

FIG. 4 illustrates that a size of the first audio signal 107 of the frequency domain is (32, 4, 512), which means that a time length of the first audio signal 107 of the frequency domain is 32, the number of channels is 4, and the number of frequency bins is 512. 32 as the time length means that the number of frames is 32, and each frame corresponds to a predetermined time period (e.g., 5 ms). That the size of the first audio signal 107 of the frequency domain is (32, 4, 512) is merely an example, and according to an embodiment, the size of the first audio signal 107 of the frequency domain or a size of an input/output signal of each layer may be variously changed.

A first convolution layer 410 processes the first audio signal 107 of the frequency domain via filters, each having 3×1 size. As a result of the processing by the first convolution layer 410, a feature signal 415 with a size of (32, 4, a) may be obtained.

A second convolution layer 420 processes an input signal via b filters, each having 3×1 size. As a result of the processing by the second convolution layer 420, a feature signal 425 with a size of (32, 4, b) may be obtained.

A third convolution layer 430 processes an input signal via four (4) filters, each having 3×1 size. As a result of the processing by the third convolution layer 430, a feature signal 435 with a size of (32, 4, 4) may be obtained.

A reshape layer 440 obtains a frequency feature signal 109 with a size of (128, 4) by changing the feature signal 435 with the size of (32, 4, 4). The reshape layer 440 may obtain the frequency feature signal 109 with the size of (128, 4) by moving, in a time-axis direction, samples identified by a second frequency bin to a fourth frequency bin from among samples of the feature signal 435 with the size of (32, 4, 4).

The first DNN 400 according to an embodiment of the disclosure obtains the frequency feature signal 109 having the same number of channels as the first audio signal 107 of the frequency domain, but, in a predetermined time period, the number of samples of each channel thereof is smaller than the first audio signal 107 of the frequency domain. While FIG. 4 illustrates that the first DNN 400 includes 3 convolution layers and 1 reshape layer, but this is merely an example, and provided that the frequency feature signal 109 can be obtained, wherein the number of channels thereof is equal to the first audio signal 107 of the frequency domain and the number of samples thereof is smaller than the first audio signal 107 of the frequency domain, the number of convolution layers and reshape layers included in the first DNN 400 may vary. Equally, a reshape layer may be replaced with a convolution layer, and the number and size of filters used in each convolution layer may vary.

Figure 5:
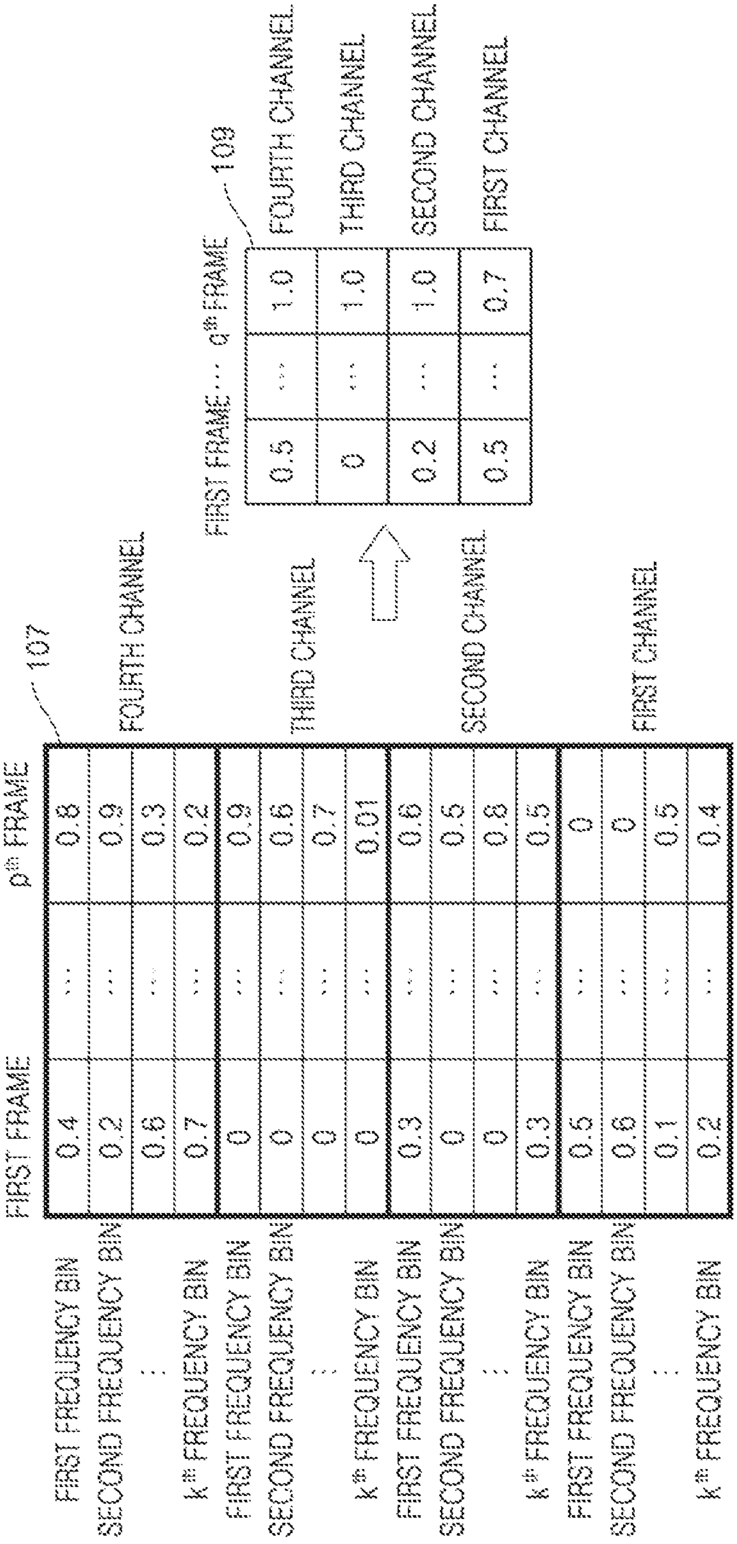
FIG. 5 illustrates comparison between a first audio data in a frequency domain and a frequency feature signal shown in FIG. 4.

FIG. 5 illustrates comparison between the first audio signal 107 of the frequency domain and the frequency feature signal 109 shown in FIG. 4.

Each sample of the first audio signal 107 of the frequency domain is identified according to a frame (i.e., a time), a frequency bin and a channel. Referring to FIG. 5, k samples exist in a first channel during a first frame.

The frequency feature signal 109 has a small number of samples per channel during a predetermined time period, compared to the first audio signal 107 of the frequency domain. For example, the number of samples of each channel during the predetermined time period may be 1. As illustrated in FIG. 5, the number of samples included in the first channel during the first frame may be 1.

Samples of the frequency feature signal 109 may be a representative value of a plurality of frequency bands of a particular channel during the predetermined time period. For example, a representative value of a fourth channel during the first frame, i.e., a sample value of 0.5 may be a representative value of frequency bands corresponding to a first frequency bin to a kth frequency bin during the first frame.

As described above, the frequency feature signal 109 may indicate a correlation between channels of the first audio signal 105, in particular, may indicate a correlation between channels of the first audio signal 105 in a frequency domain. For example, that a sample value of a third channel during the first frame of the frequency feature signal 109 is 0 may mean that samples of a third channel signal during the first frame of the first audio signal 107 of the frequency domain, i.e., frequency coefficients, may be 0. Also, that a sample value of a first channel is 0.5 and a sample value of a second channel is 0.2 during the first frame of the frequency feature signal 109 may mean that non-zero frequency components, i.e., non-zero frequency coefficients, in a first channel signal during the first frame of the first audio signal 107 of the frequency domain may be greater than a second channel signal.

According to an embodiment of the disclosure, a correlation between channels is signaled to the decoding apparatus 900 by using the frequency feature signal 109 having a smaller number of samples compared to the first audio signal 107 of the frequency domain, and thus, the number of bits of audio data may be decreased, compared to a case of using the first audio signal 107 of the frequency domain.

Figure 6:
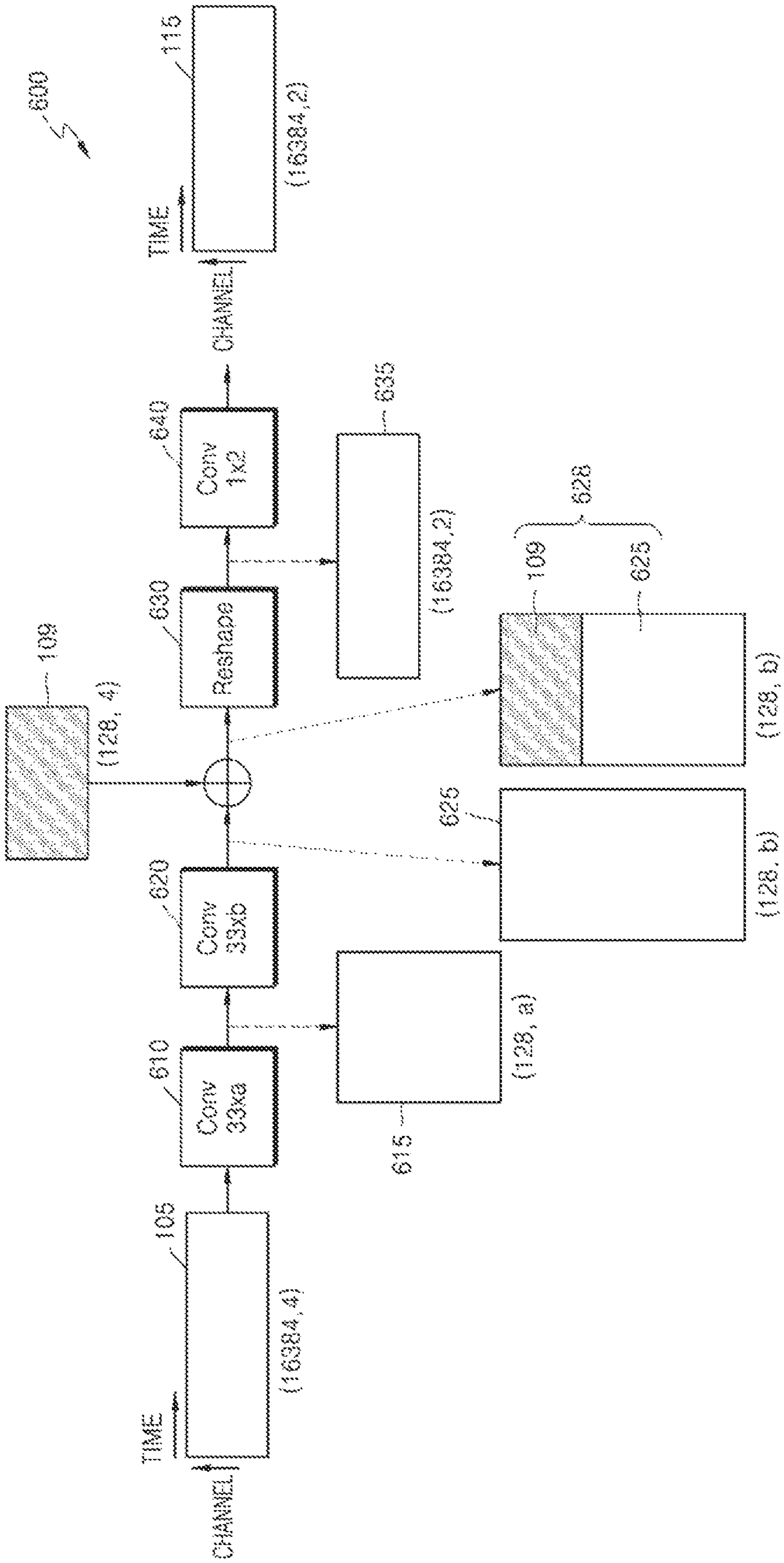
FIG. 6 illustrates a second DNN according to an embodiment.

FIG. 6 illustrates a second DNN 600 according to an embodiment.

The second DNN 600 includes at least one convolution layer and at least one reshape layer.

The at least one convolution layer included in the second DNN 600 may be one-dimensional convolution layer, unlike a two-dimensional convolution layer of the first DNN 400. A filter of the one-dimensional convolution layer moves only in a horizontal direction or vertical direction according to a stride, for convolution processing, but a filter of the two-dimensional convolution layer moves in horizontal and vertical directions, according to a stride.

Referring to FIG. 6, the first audio signal 105 is input to the second DNN 600. Samples of the first audio signal 105 are identified by a time and a channel. That is, the first audio signal 105 may be two-dimensional data.

A first convolution layer 610 convolution-processes the first audio signal 105 via filters, each having a size of 33. That the size of the filter of the first convolution layer 610 is 33 may mean that a horizontal size of the filter is 33, and a vertical size thereof is equal to a vertical size of an input signal, i.e., a vertical size (the number of channels) of the first audio signal 105. As a result of the processing by the first convolution layer 610, a feature signal 615 with a size of (128, a) is output.

A second convolution layer 620 receives an input of an output signal of the first convolution layer 610, and then processes the input signal via b filters, each having a size of 33. As a result of the processing, an audio feature signal 625 with a size of (128, b) may be obtained. According to a combination scheme of the frequency feature signal 109 to be described below, a size of the audio feature signal 625 may be (128, b-4).

The frequency feature signal 109 may be embedded during a processing procedure of the second DNN 600 with respect to the first audio signal 105, and as illustrated in FIG. 6, the frequency feature signal 109 may be combined with the audio feature signal 625, and an integrated feature signal 628 obtained as a result of the combination may be input to a next layer.

A method of combining the frequency feature signal 109 with the audio feature signal 625 will now be described with reference to FIGS. 7 and 8.

Figure 7:
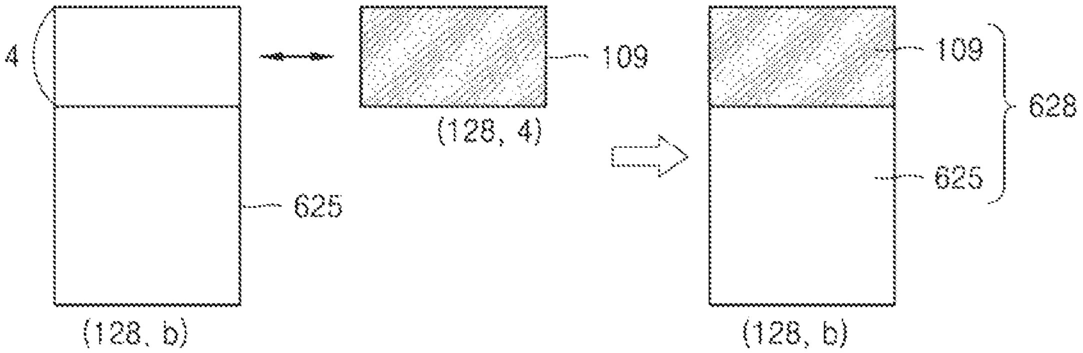
FIG. 7 illustrates a method of combining an audio feature signal with a frequency feature signal.
Figure 8:
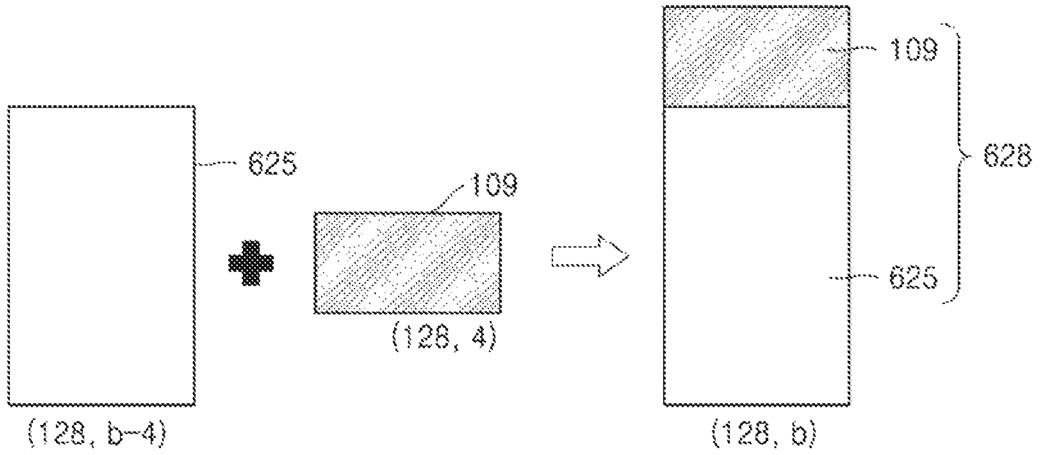
FIG. 8 illustrates a method of combining an audio feature signal with a frequency feature signal.

FIGS. 7 and 8 illustrate a method of combining the audio feature signal 625 with the frequency feature signal 109.

Referring to FIG. 7, samples of a predetermined number of channels (four (4) in FIG. 7) of the audio feature signal 625 may be replaced with samples of the frequency feature signal 109. The channels of the audio feature signal 625 to be replaced may include a predetermined number of consecutive channels starting from a first channel or a predetermined number of consecutive channels starting from a last channel from among the channels of the audio feature signal 625. For example, when the frequency feature signal 109 has 4 channels, samples of a first channel to a fourth channel of the audio feature signal 625 are replaced with samples of the frequency feature signal 109, such that the integrated feature signal 628 may be obtained.

Next, referring to FIG. 8, the frequency feature signal 109 may be added to the audio feature signal 625. That is, when the audio feature signal 625 has b-4 channels and the frequency feature signal 109 has 4 channels, the frequency feature signal 109 may be added to the audio feature signal 625 so as to obtain the integrated feature signal 628 having b channels. The frequency feature signal 109 may be added to the front of a first channel of the audio feature signal 625 or may be added to the rear of a last channel of the audio feature signal 625.

In FIGS. 7 and 8, the reason of combining the frequency feature signal 109 with the front portion or the rear portion of the audio feature signal 625 is for the decoding apparatus 900 to easily separate the frequency feature signal from the integrated feature signal.

Referring back to FIG. 6, the integrated feature signal 628 is input to a reshape layer 630. The integrated feature signal 628 with a size of (128, b) may be changed to a feature signal 635 with a size of (16384, 2) via the reshape layer 630.

An output signal (the feature signal 635) of the reshape layer 630 is input to a third convolution layer 640. The third convolution layer 640 obtains the second audio signal 115 with a size of (16384, 2) by convolution-processing a signal input via two filters, each having a size of 1. That the size of the second audio signal 115 is (16384, 2) means that the second audio signal 115 is a stereo signal of 16384 frames having 2 channels. According to an embodiment, when the second audio signal 115 is a mono signal, a size of the second audio signal 115 may be (16384, 1).

The second DNN 600 according to an embodiment outputs the second audio signal 115 that has the same time length as a time length of the first audio signal 105 and has a smaller number of channels than the number of channels of the first audio signal 105. Provided that the second DNN 600 can output the second audio signal 115, the second DNN 600 may have various structures other than a structure shown in FIG. 6. In other words, while FIG. 6 illustrates that the second DNN 600 includes 3 convolution layers and 1 reshape layer, this is merely an example, and thus, the number of convolution layers and reshape layers included in the second DNN 600 may vary, provided that the second audio signal 115 having the same time length as a time length of the first audio signal 105 and having a smaller number of channels than the number of channels of the first audio signal 105 is obtainable. Equally, a reshape layer may be replaced with a convolution layer, and the number and size of filters used in each convolution layer may vary.

The encoding apparatus 200 may transmit audio data obtained via AI-encoding and first encoding to the decoding apparatus 900 via a network. According to an embodiment, the audio data may be stored in a data storage medium including a magnetic medium such as a hard disk, a floppy disk, or a magnetic tape, an optical recording medium such as a compact disc read-only memory (CD-ROM) or a digital versatile disc (DVD), or a magneto-optical medium such as a floptical disk.

Figure 9:
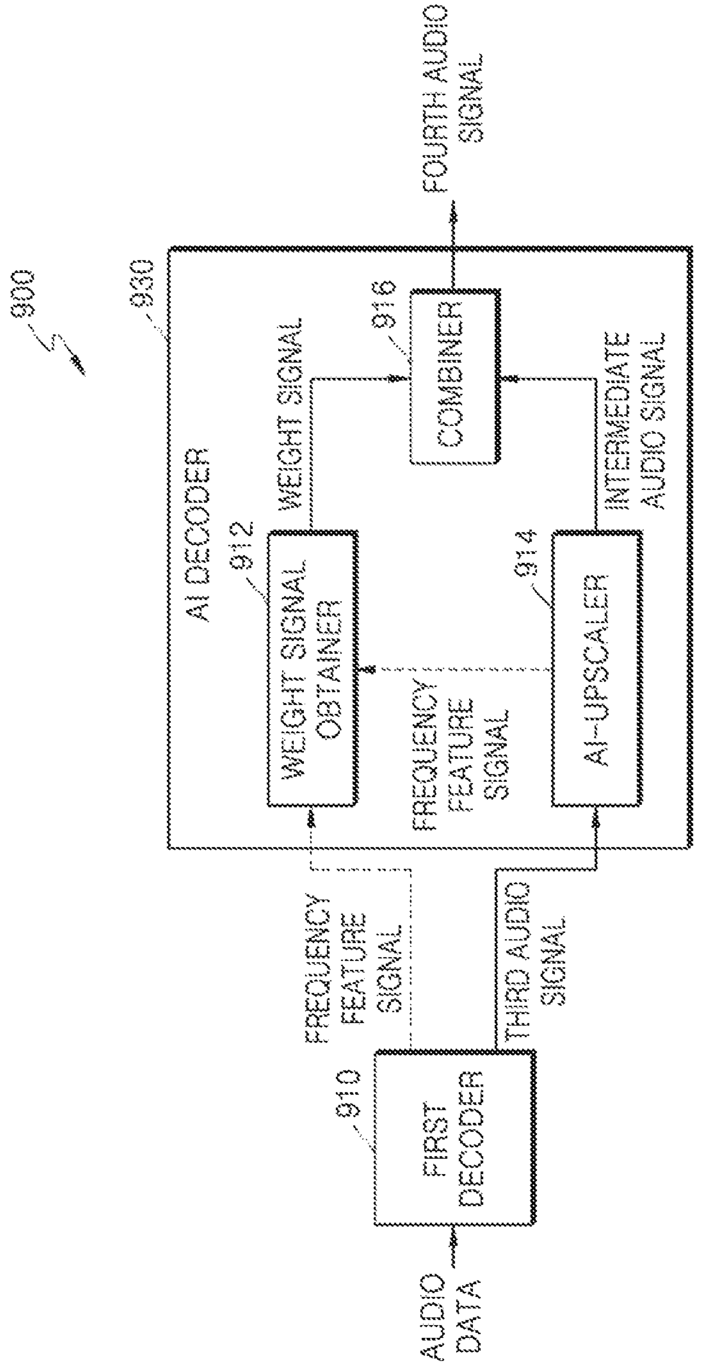
FIG. 9 illustrates a block diagram of a configuration of an audio decoding apparatus according to an embodiment.

FIG. 9 illustrates a block diagram of a configuration of the decoding apparatus 900 according to an embodiment.

Referring to FIG. 9, the decoding apparatus 900 includes a first decoder 910 and an AI-decoder 930. The AI-decoder 930 may include a weight signal obtainer 912, an AI-upscaler 914, and a combiner 916.

While FIG. 9 illustrates the first decoder 910 and the AI-decoder 930 as individual elements, the first decoder 910 and the AI-decoder 930 may be implemented by one processor. In this case, they may be implemented as a dedicated processor or may be implemented as a combination of software and a general-purpose processor, such as an AP, a CPU, or a GPU. The dedicated processor may include a memory for implementing an embodiment of the disclosure or may include a memory processor for using an external memory.

The first decoder 910 and the AI-decoder 930 may be configured by a plurality of processors. In this case, they may be implemented as a combination of dedicated processors or a combination of software and a plurality of general-purpose processors such as AP, CPU or GPU. The weight signal obtainer 912, the AI-upscaler 914, and the combiner 916 may be implemented by different processors.

The first decoder 910 obtains audio data. The audio data obtained by the first decoder 910 may be referenced as an input audio signal. The audio data may be received via a network or may be obtained from a data storage medium including a magnetic medium such as a hard disk, a floppy disk, or a magnetic tape, an optical recording medium such as a CD-ROM or a DVD, or a magneto-optical medium such as a floptical disk.

The first decoder 910 first encodes the audio data. The third audio signal 135 is obtained as a result of the first encoding with respect to the audio data, and the third audio signal 135 is output to the AI-upscaler 914. The third audio signal 135 may include m channels as the second audio signal 115.

As described above, when a frequency feature signal is included in a supplemental region of audio data, the frequency feature signal is reconstructed via first encoding with respect to the audio data. When a frequency feature signal is embedded in the third audio signal 135, the frequency feature signal may be obtained via processing by a fourth DNN of the AI-upscaler 914.

The AI-decoder 930 reconstructs the fourth audio signal 145 including n channels, based on the third audio signal 135 and the frequency feature signal.

As a signal loss according to a channel change due to AI-downscale cannot be compensated for, by only obtaining the fourth audio signal 145 by AI-upscaling the third audio signal 135, the AI-decoder 930 according to an embodiment obtains, from the frequency feature signal, a weight signal for compensating for the signal loss.

In detail, the weight signal obtainer 912 obtains a weight signal of n channels by processing a frequency feature signal of n channels via a third DNN. A time length of the weight signal may be equal to a time length of an intermediate audio signal obtained by the AI-upscaler 914 and may be greater than a time length of the frequency feature signal. Sample values included in the weight signal are weights to be respectively applied to samples of the intermediate audio signal obtained by the AI-upscaler 914, and are used to reflect a correlation between channels of the first audio signal 105 with respect to sample values of each channel of the intermediate audio signal.

The third DNN of the weight signal obtainer 912 will now be described with reference to FIG. 10.

Figure 10:
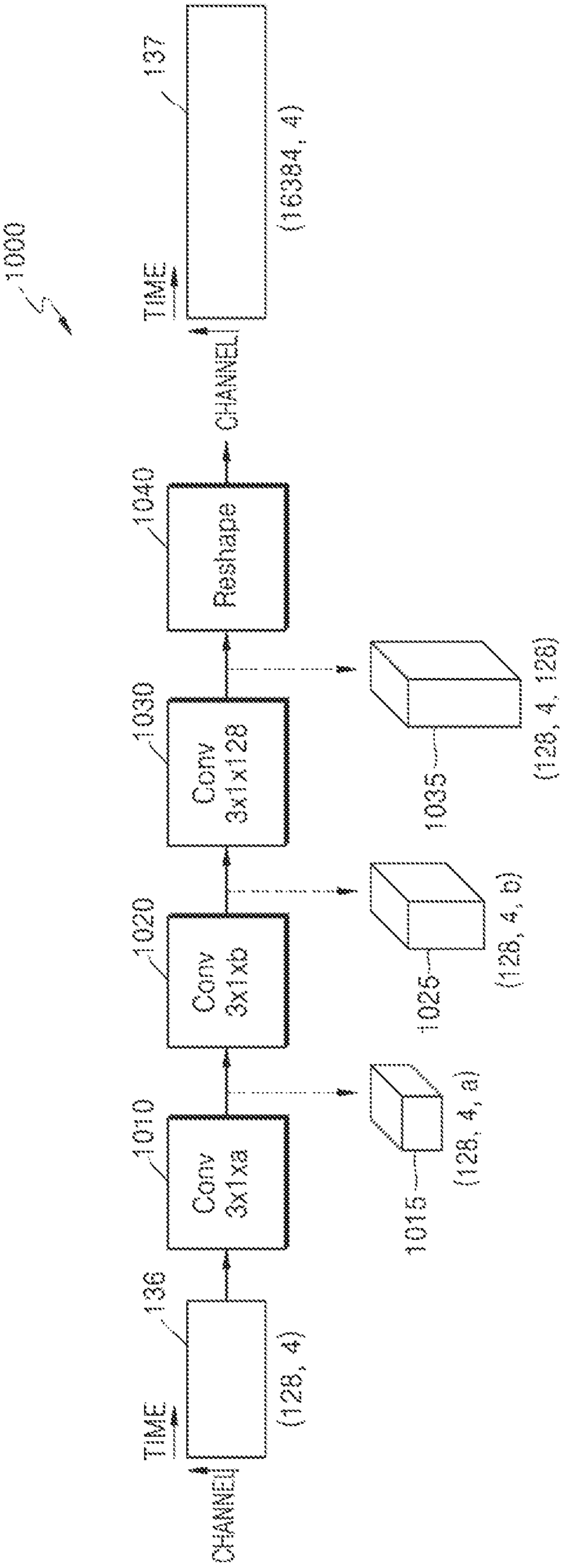
FIG. 10 illustrates a third DNN according to an embodiment.

FIG. 10 illustrates a third DNN 1000 according to an embodiment.

Referring to FIG. 10, the third DNN 1000 may include at least one convolution layer and at least one reshape layer. The convolution layer included in the third DNN 1000 may be a two-dimensional convolution layer.

A frequency feature signal 136 is input to the third DNN 1000, and a weight signal 137 is obtained via a processing procedure in the third DNN 1000.

As illustrated in FIG. 10, a size of the frequency feature signal 136 is (128, 4), which means that the frequency feature signal 136 has 4 channels of 128 frames.

A first convolution layer 1010 obtains a feature signal 1015 with a size of (128, 4, a) by processing the frequency feature signal 136 via filters, each having 3×1 size.

A second convolution layer 1020 obtains a feature signal 1025 with a size of (128, 4, b) by processing an input signal via b filters, each having 3×1 size.

A third convolution layer 1030 obtains a feature signal 1035 with a size of (128, 4, 128) by processing an input signal via 128 filters, each having 3×1 size.

A reshape layer 1040 obtains the weight signal 137 with a size of (16384, 4) by changing locations of samples in the feature signal 1035 with a size of (128, 4, 128). For example, the reshape layer 1040 may obtain the weight signal 137 with a size of (16384, 4) by moving, on a time axis, samples of a second frequency bin to a 128th frequency bin from among samples in the feature signal 1035 with a size of (128, 4, 128).

The third DNN 1000 according to an embodiment obtains the weight signal 137 having the same time length and channels as a time length and channels of the intermediate audio signal output from the AI-upscaler 914. Therefore, provided that the third DNN 1000 can output the weight signal 137, the third DNN 1000 may have various structures other than a structure shown in FIG. 10. In other words, while FIG. 10 illustrates that the third DNN 1000 includes 3 convolution layers and 1 reshape layer, this is merely an example, and thus, the number of convolution layers and reshape layers included in the third DNN 1000 may vary, provided that the weight signal 137 having the same time length and channels as a time length and channels of the intermediate audio signal is obtainable. Equally, a reshape layer may be replaced with a convolution layer, and the number and size of filters used in each convolution layer may vary.

In the above, the first DNN 400 obtains the frequency feature signal 109 with respect to the first audio signal 107 of the frequency domain which is transformed from the first audio signal 105, whereas the weight signal obtainer 912 does not inverse-transform the frequency feature signal 136 or the weight signal 137 into a time domain. This is to prevent a delay due to inverse-transformation in a server-client structure. In other words, for fast content consumption by a client terminal receiving an audio signal from a server in a streaming manner, a delay due to inverse-transformation is terminated.

Next, a fourth DNN of the AI-upscaler 914 will now be described with reference to FIG. 11.

Figure 11:
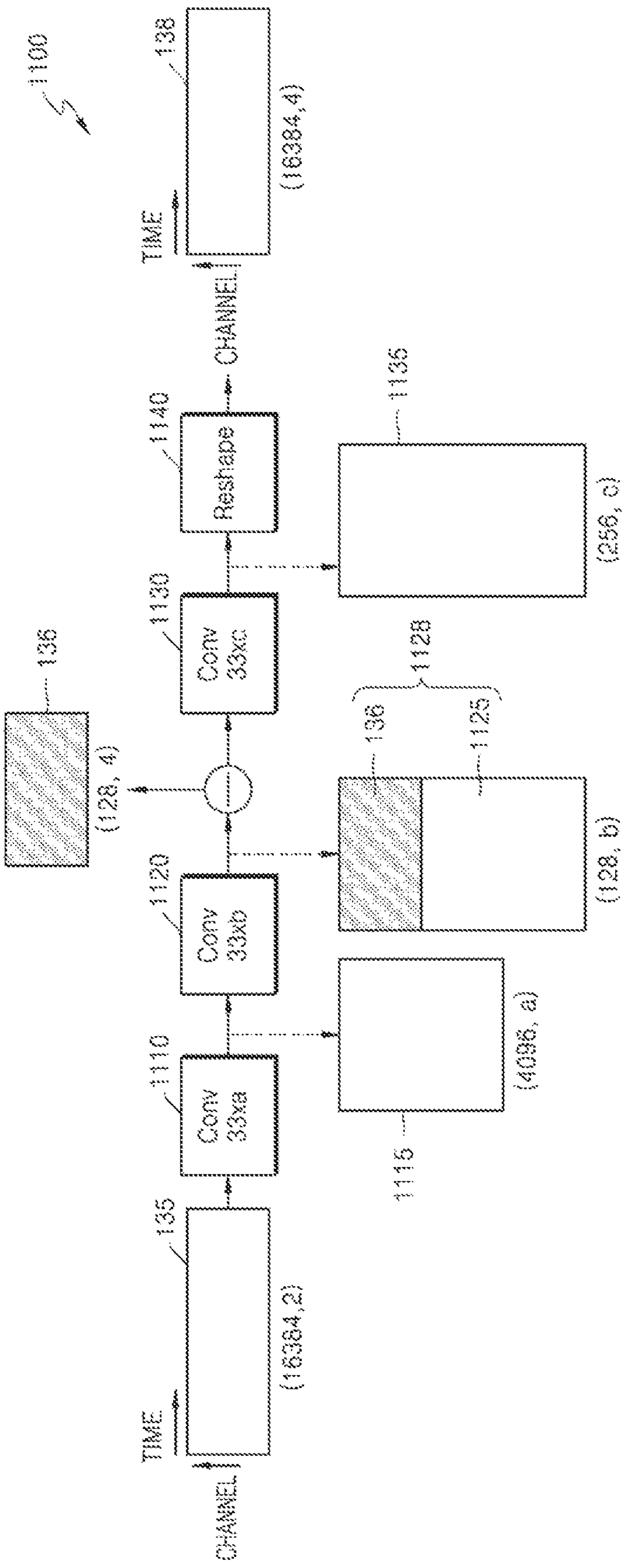
FIG. 11 illustrates a fourth DNN according to an embodiment.

FIG. 11 illustrates a fourth DNN 1100 according to an embodiment.

Referring to FIG. 11, the fourth DNN 1100 may include at least one convolution layer and at least one reshape layer. The convolution layer included in the fourth DNN 1100 may be a one-dimensional convolution layer.

The third audio signal 135 is input to the fourth DNN 1100, and is AI-upscaled to an intermediate audio signal 138 via a processing procedure in the fourth DNN 1100.

As illustrated in FIG. 11, a size of the third audio signal 135 is (16384, 2), which means that the third audio signal 135 has 2 channels of 16384 frames.

A first convolution layer 1110 obtains a feature signal 1115 with a size of (4096, a) by processing the third audio signal 135 via filters, each having 33 size.

A second convolution layer 1120 obtains an integrated feature signal 1128 with a size of (128, b) by processing an input signal via b filters, each having 33 size. In a training procedure to be described below, the fourth DNN 1100 may be trained to output, via the second convolution layer 1120, the integrated feature signal 1128 being equal/similar to the integrated feature signal 628 obtained during a processing procedure by the second DNN 600 with respect to the first audio signal 105.

When the frequency feature signal 136 is embedded in the third audio signal 135, the frequency feature signal 136 is extracted from the integrated feature signal 1128. In more detail, samples of a predetermined number of consecutive channels starting from a first channel or a predetermined number of consecutive channels starting from a last channel from among channels of the integrated feature signal 1128 may be extracted as the frequency feature signal 136. As described above, the frequency feature signal 136 is transmitted to the weight signal obtainer 912.

A third convolution layer 1130 obtains a feature signal 1135 with a size of (256, c) by processing an input signal (e.g., an audio feature signal 1125 separated from an integrated feature signal 1128) via c filters, each having 33 size.

A reshape layer outputs an intermediate audio signal 138 with a size of (16384, 4) by changing locations of samples in the feature signal 1135 with a size of (256, c).

The fourth DNN 1100 according to an embodiment obtains the intermediate audio signal 138 having the same time length and channels as the time length and channels of the first audio signal 105. Therefore, provided that the fourth DNN 1100 can output the intermediate audio signal 138, the fourth DNN 1100 may have various structures other than a structure shown in FIG. 11. In other words, while FIG. 11 illustrates that the fourth DNN 1100 includes 3 convolution layers and 1 reshape layer, this is merely an example, and thus, the number of convolution layers and reshape layers included in the fourth DNN 1100 may vary, provided that the intermediate audio signal 138 having the same time length and channels as the time length and channels of the first audio signal 105 is obtainable. Equally, a reshape layer may be replaced with a convolution layer, and the number and size of filters used in each convolution layer may vary.

Referring back to FIG. 9, the weight signal output by the weight signal obtainer 912 and the intermediate audio signal output by the AI-upscaler 914 may be input to the combiner 916, and the combiner 916 may obtain the fourth audio signal 145 by applying samples of the weight signal to samples of the intermediate audio signal. For example, the combiner 916 may obtain the fourth audio signal 145 by multiplying in a 1:1 manner sample values of the intermediate audio signal by respectively corresponding sample values of the weight signal.

Unlike the decoding apparatus 900 shown in FIG. 9, a legacy decoding apparatus incapable of performing AI-decoding may obtain the third audio signal 135 by first decoding audio data. The legacy decoding apparatus may output the third audio signal 135 for reproduction via a speaker. That is, according to an embodiment, the audio data obtained as a result of the first encoding with respect to the second audio signal 115 may have lower compatibility that is available for both the decoding apparatus 900 capable of performing AI-decoding and the legacy decoding apparatus incapable of performing AI-decoding.

Hereinafter, with reference to FIGS. 12 to 17, a method of training the first DNN 400, the second DNN 600, the third DNN 1000, and the fourth DNN 1100 will now be described.

Figure 12:
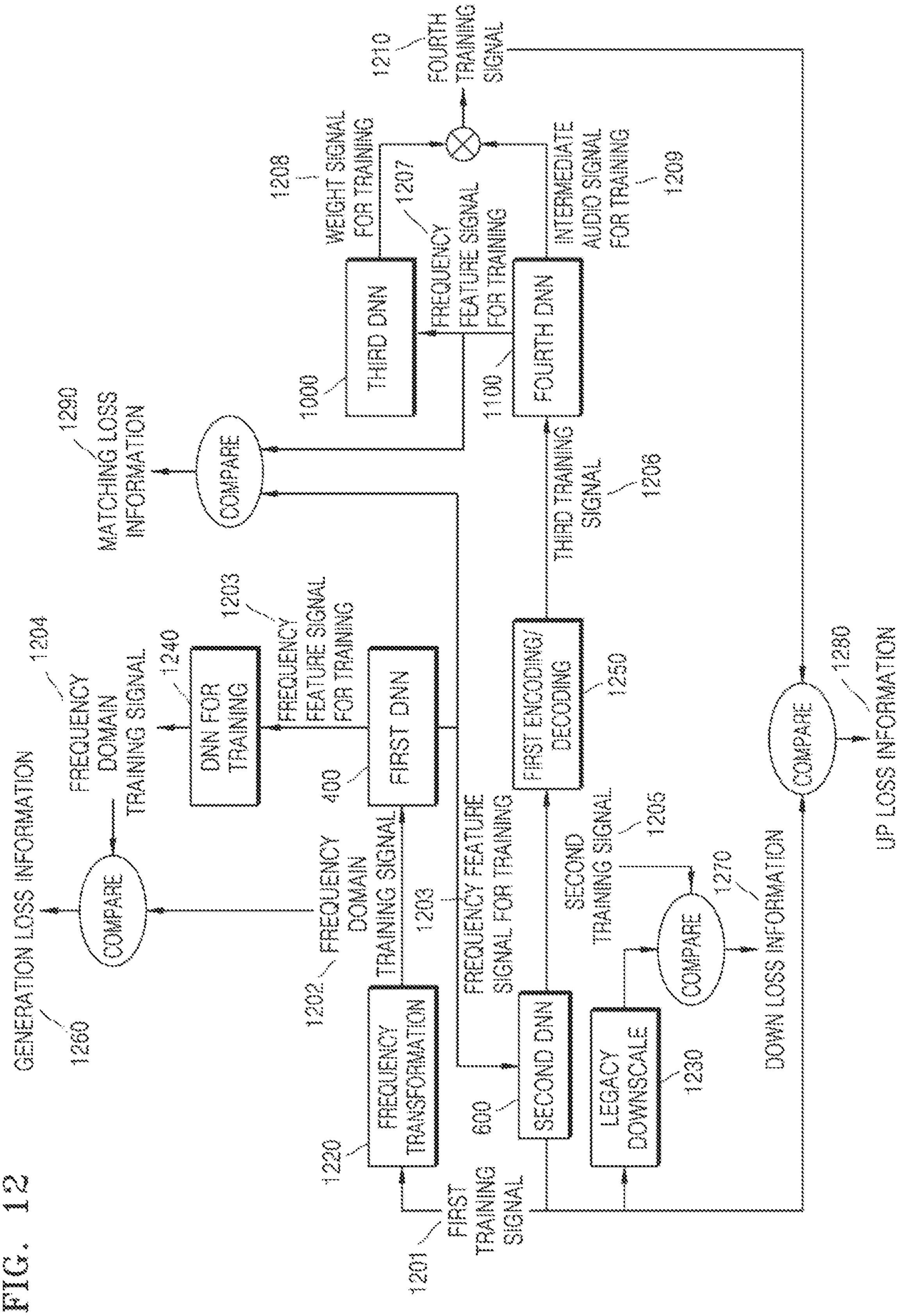
FIG. 12 illustrates a method of training a first DNN, a second DNN, a third DNN, and a fourth DNN.

FIG. 12 illustrates a method of training the first DNN 400, the second DNN 600, the third DNN 1000, and the fourth DNN 1100.

FIG. 12 illustrates a method of training the second DNN 600 for embedding a frequency feature signal in the second audio signal 115.

A first training signal 1201 in FIG. 12 corresponds to the first audio signal 105, and a second training signal 1205 corresponds to the second audio signal 115. Also, a third training signal 1206 corresponds to the third audio signal 135, and a fourth training signal 1210 corresponds to the fourth audio signal 145.

A frequency domain training signal 1202 is obtained via a frequency transformation 1220 with respect to the first training signal 1201, and the frequency domain training signal 1202 is input to the first DNN 400. The first DNN 400 obtains a frequency feature signal for training 1203 by processing the frequency domain training signal 1202 according to a preset parameter. The frequency feature signal for training 1203 and the first training signal 1201 are input to the second DNN 600, and the second DNN 600 obtains the second training signal 1205 in which the frequency feature signal for training 1203 is embedded via the preset parameter.

The second training signal 1205 is changed to the third training signal 1206 via first encoding and first decoding 1250. In more detail, audio data for training is obtained via first encoding with respect to the second training signal 1205, and the third training signal 1206 is obtained via first decoding with respect to the audio data for training. The third training signal 1206 is input to the fourth DNN 1100. The fourth DNN 1100 obtains a frequency feature signal for training 1207 and an intermediate audio signal for training 1209 from the third training signal 1206 via a preset parameter. The third DNN 1000 obtains a weight signal for training 1208 by processing the frequency feature signal for training 1207 via a preset parameter. The fourth training signal 1210 is obtained by combining the weight signal for training 1208 with the intermediate audio signal for training 1209.

In FIG. 12, the frequency feature signal for training 1203 obtained by the first DNN 400 is input to a DNN for training 1240, and the DNN for training 1240 is a DNN for verifying whether the frequency feature signal for training 1203 is accurately generated by the first DNN 400. The DNN for training 1240 may have a mirror structure of the first DNN 400. The DNN for training 1240 reconstructs a frequency domain training signal 1204 by processing the frequency feature signal for training 1203.

Generation loss information ("$\text{Loss}_{DG}$") 1260 is obtained as a result of comparison between the frequency domain training signal 1202 obtained via the frequency transformation 1220 and the frequency domain training signal 1204 obtained by the DNN for training 1240. The generation loss information ("$\text{Loss}_{DG}$") 1260 may include at least one of a L1-norm value, a L2-norm value, a Structural Similarity (SSIM) value, a Peak Signal-To-Noise Ratio-Human Vision System (PSNR-HVS) value, a Multiscale SSIM (MS-SSIM) value, a Variance Inflation Factor (VIF) value and a Video Multimethod Assessment Fusion (VMAF) value between the frequency domain training signal 1202 obtained via the frequency transformation 1220 and the frequency domain training signal 1204 obtained by the DNN for training 1240. For example, the generation loss information 1260 may be expressed as Equation 1 below.

$$\text{Loss}DG=\|F(A_{nch})-D(C_{Embed})\|_2^2 \qquad \text{[Equation 1]}$$

In Equation 1, FO indicates the frequency transformation 1220, and $A_{nch}$ indicates the first training signal 1201. DO indicates processing by the DNN for training 1240, and $C_{Embed}$ indicates the frequency feature signal for training 1203.

The generation loss information 1260 indicates how much the frequency domain training signal 1204 obtained by processing the frequency feature signal for training 1203 by the DNN for training 1240 is similar to the frequency domain training signal 1202 obtained via the frequency transformation 1220.

The first training signal 1201 is changed to a sub-channel training signal via a legacy downscale 1230, and down loss information ("$\text{Loss}_{Down}$") 1270 is obtained as a result of comparison between the sub-channel training signal and the second training signal 1205. The down loss information ("$\text{Loss}_{Down}$") 1270 may include at least one of a L1-norm value, a L2-norm value, a SSIM value, a PSNR-HVS value, a MS-SSIM value, a VIF value and a VMAF value between a sub-channel training signal and the second training signal 1205. For example, the down loss information 1270 may be expressed as Equation 2 below.

$$\text{LossDown}=(1-\beta)\cdot\|S_{mch}-S_{Label}\|_2^2+\beta\cdot\|F(S_{mch})-F(S_{label})\|_2^2 \quad \text{[Equation 2]}$$

In Equation 2, ρ is a predetermined weight, $S_{mch}$ is the second training signal 1205, and $S_{Label}$ indicates the sub-channel training signal. F( ) indicates frequency transformation.

The down loss information 1270 indicates how much the second training signal 1205 in which the frequency feature signal for training 1203 is embedded is similar to the sub-channel training signal obtained via the legacy downscale 1230. As the second training signal 1205 is more similar to the sub-channel training signal, a quality of the third training signal 1206 may be improved. In particular, a quality of a signal reconstructed by a legacy decoding apparatus may be improved.

According to a result of comparison between the first training signal 1201 and the fourth training signal 1210, up loss information ("$\text{Loss}_{Up}$") 1280 is obtained. The up loss information ("$\text{Loss}_{Up}$") 1280 may include at least one of a L1-norm value, a L2-norm value, a SSIM value, a PSNR-HVS value, a MS-SSIM value, a VIF value and a VMAF value between the first training signal 1201 and the fourth training signal 1210. For example, the up loss information 1280 may be expressed as Equation 3 below.

$$\text{LossUp}=(1-\beta)\cdot\|A_{Pnch}-A_{uch}\|_2^2+\beta\cdot\|F(A_{Pnch})-F(A_{nch})\|_2^2 \quad \text{[Equation 3]}$$

In Equation 3, β is a predetermined weight, $A_{nch}$ indicates the first training signal 1201, and $A_{pnch}$ indicates the fourth training signal 1210. F( ) indicates frequency transformation.

The up loss information 1280 indicates how accurately the weight signal for training 1208 and the intermediate audio signal for training 1209 are generated.

According to a result of comparison between the frequency feature signal for training 1203 output by the first DNN 400 and the frequency feature signal for training 1207 extracted by the fourth DNN 1100, matching loss information ("$\text{Loss}_M$") 1290 is obtained. The matching loss information ("$\text{Loss}_M$") 1290 may include at least one of a L1-norm value, a L2-norm value, a SSIM value, a PSNR-HVS value, a MS-SSIM value, a VIF value and a VMAF value between the two frequency feature signals for training 1203 and 1207. For example, the matching loss information 1290 may be expressed as Equation 4 below.

$$\text{Loss}M=\|C_{Embed}-C_{Extract}\|_2^2 \quad \text{[Equation 4]}$$

In Equation 4, $C_{Embed}$ indicates the frequency feature signal for training 1203 embedded in the second training signal 1205, and $C_{Extract}$ indicates the frequency feature signal for training 1207 extracted by the fourth DNN 1100.

The matching loss information 1290 indicates how much an integrated feature signal intermediately output by the fourth DNN 1100 is similar to an integrated feature signal obtained by the second DNN 600. When the integrated feature signal output by the fourth DNN 1100 is similar to the integrated feature signal obtained by the second DNN 600, two frequency feature signals thereof are also similar.

The first DNN 400, the second DNN 600, the third DNN 1000, and the fourth DNN 1100 may update a parameter to decrease or minimize final loss information obtained by combining at least one of the generation loss information 1260, the down loss information 1270, the up loss information 1280, and the matching loss information 1290.

In detail, the first DNN 400 and the DNN for training 1240 may update a parameter to decrease or minimize the generation loss information 1260. Also, the second DNN 600, the third DNN 1000, and the fourth DNN 1100 may each update a parameter to decrease or minimize the final loss information obtained as a result of the combination of the down loss information 1270, the up loss information 1280, and the matching loss information 1290.

Equation of training of the first DNN 400 and the DNN for training 1240 is as below.

$$\underset{\omega_{Phase1}}{\text{argmin}}(Loss_{DG}) \quad \text{[Equation 5]}$$

In Equation 5, $\omega_{Phase1}$ indicates a parameter set of the first DNN 400 and the DNN for training 1240. The first DNN 400 and the DNN for training 1240 obtain, via training, the parameter set to minimize the generation loss information ("$\text{Loss}_{DG}$") 1260.

Equation of training of the second DNN 600, the third DNN 1000, and the fourth DNN 1100 is as below.

$$\underset{\omega_{Phase2}}{\text{argmin}}(\alpha\cdot Loss_{down}+(1-\alpha)\cdot Loss_{up}+\gamma\cdot Loss_M) \quad \text{[Equation 6]}$$

In Equation 6, $\omega_{Phase2}$ indicates a parameter set of the second DNN 600, the third DNN 1000, and the fourth DNN 1100, and α and γ indicate preset weights. The second DNN 600, the third DNN 1000, and the fourth DNN 1100 obtain the parameter set to minimize, via training, the final loss information that is the combination of the down loss information ("$\text{Loss}_{Down}$") 1270, the up loss information ("$\text{Loss}_{Up}$") 1280, and the matching loss information ("$\text{Loss}_M$") 1290 according to the preset weights.

In an embodiment, training of the first DNN 400 and the DNN for training 1240 and training of the second DNN 600, the third DNN 1000, and the fourth DNN 1100 may be alternately performed. In more detail, the first DNN 400 and the DNN for training 1240 process an input signal according to an initially-set parameter, and then update the parameter according to the generation loss information 1260. Then, the first DNN 400 and the DNN for training 1240 process an input signal according to the updated parameter, and the second DNN 600, the third DNN 1000, and the fourth DNN 1100 process an input signal according to the initially-set parameter. The second DNN 600, the third DNN 1000, and the fourth DNN 1100 each update a parameter according to at least one of the matching loss information 1290, the up loss information 1280, and the down loss information 1270 obtained as a result of processing the input signal. When the updating of the parameter by the second DNN 600, the third DNN 1000, and the fourth DNN 1100 is completed, the first DNN 400 and the DNN for training 1240 update the parameter again. That is, according to an embodiment, training of the first DNN 400 and the DNN for training 1240 and training of the second DNN 600, the third DNN 1000, and the fourth DNN 1100 are alternately performed, such that a parameter of each DNN may be stably trained to a higher accuracy level.

Figure 13:
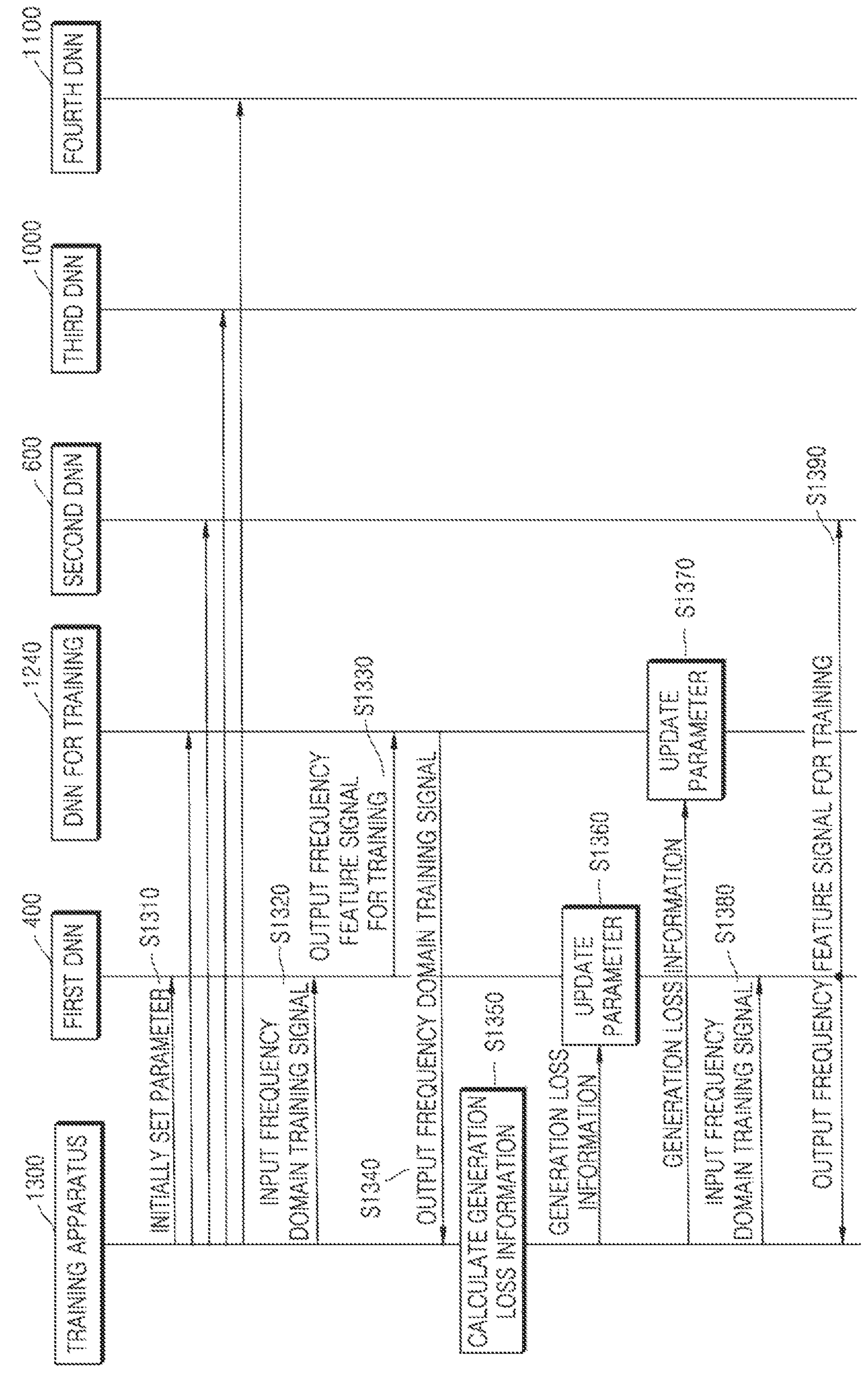
FIG. 13 illustrates a procedure for training, by a training apparatus, a first DNN, a second DNN, a third DNN and a fourth DNN.
Figure 14:
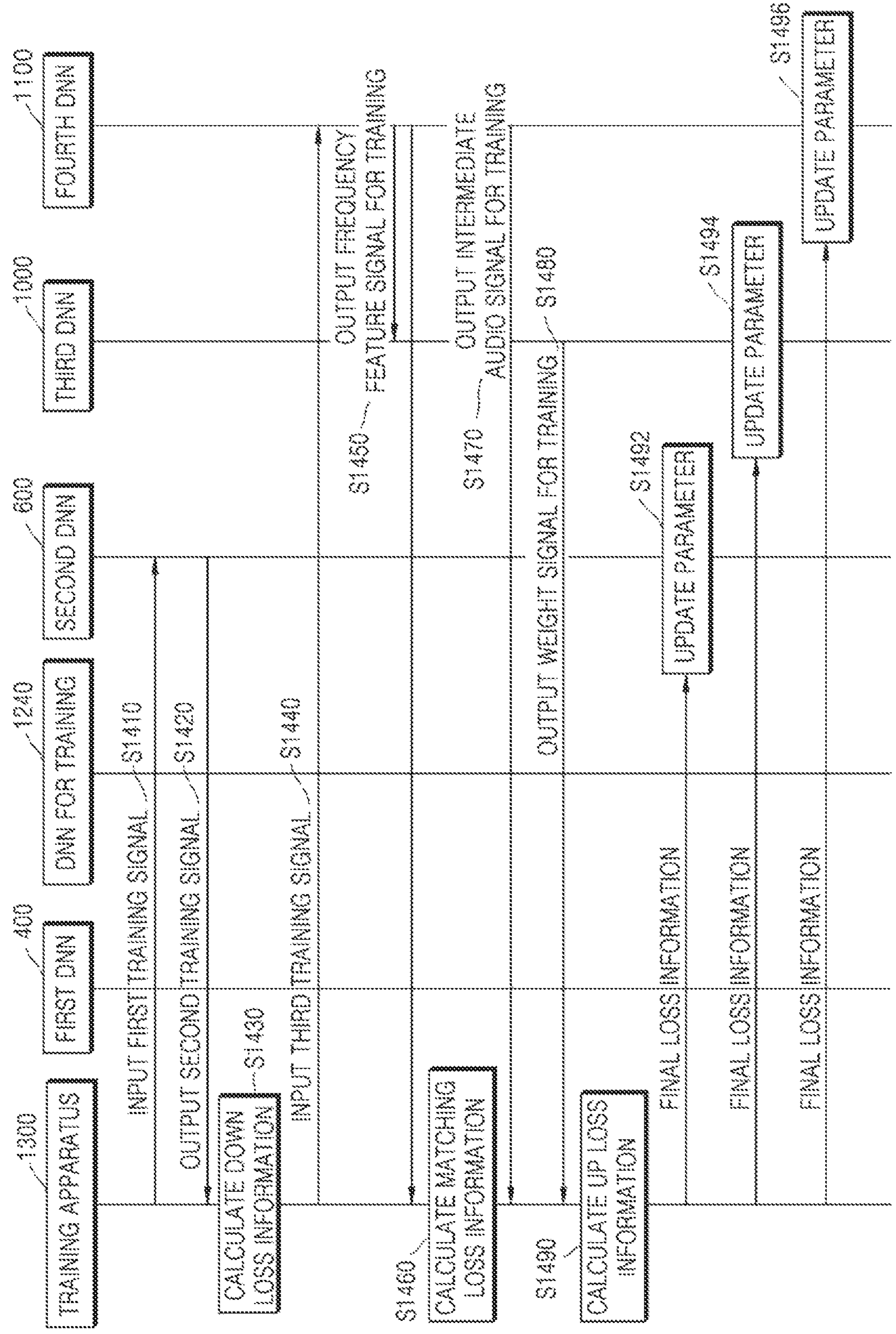
FIG. 14 illustrates a procedure for training, by a training apparatus, a first DNN, a second DNN, a third DNN and a fourth DNN.

FIGS. 13 and 14 illustrate flowcharts for describing a procedure for training, by a training apparatus 1300, the first DNN 400, the second DNN 600, the third DNN 1000, and the fourth DNN 1100.

Training of the first DNN 400, the DNN for training 1240, the second DNN 600, the third DNN 1000, and the fourth DNN 1100 (which is described with reference to FIG. 12) may be performed by the training apparatus 1300. The training apparatus 1300 may include the first DNN 400, the DNN for training 1240, the second DNN 600, the third DNN 1000, and the fourth DNN 1100. For example, the training apparatus 1300 may be the audio encoding apparatus 200 or a separate server. The third DNN 1000 and the fourth DNN 1100 obtained as a result of the training may be stored in the decoding apparatus 900.

The training apparatus 1300 initially sets parameters of the first DNN 400, the DNN for training 1240, the second DNN 600, the third DNN 1000, and the fourth DNN 1100 (S1310).

The training apparatus 1300 inputs, to the first DNN 400, the frequency domain training signal 1202 obtained from the first training signal 1201 via the frequency transformation 1220 (S1320). The first DNN 400 outputs the frequency feature signal for training 1203 to the DNN for training 1240 (S1330), and the DNN for training 1240 outputs the reconstructed frequency domain training signal 1204 to the training apparatus 1300 (S1340).

The training apparatus 1300 compares the frequency domain training signal 1202 obtained via the frequency transformation 1220 with the frequency domain training signal 1204 output from the DNN for training 1240, and thus, calculates the generation loss information 1260 (S1350). Then, the first DNN 400 and the DNN for training 1240 each update a parameter according to the generation loss information 1260 (S1360 and S1370).

The training apparatus 1300 inputs the frequency domain training signal 1202 obtained from the first training signal 1201 via the frequency transformation 1220 back to the first DNN 400 (S1380). The first DNN 400 processes the frequency domain training signal 1202 via the updated parameter, and thus, outputs the frequency feature signal for training 1203 to the training apparatus 1300 and the second DNN 600 (S1390).

Next, in FIG. 14, the training apparatus 1300 inputs the first training signal 1201 to the second DNN 600 (S1410), and the second DNN 600 outputs the second training signal 1205 to the training apparatus 1300 by processing the frequency feature signal for training 1203 and the first training signal 1201 (S1420).

The training apparatus 1300 obtains the down loss information 1270 according to a result of comparison between the second training signal 1205 and a sub-channel training signal legacy downscaled from the first training signal 1201 (S1430).

The training apparatus 1300 inputs, to the fourth DNN 1100, the third training signal 1206 obtained via first encoding and first decoding 1250 with respect to the second training signal 1205 (S1440), and the fourth DNN 1100 outputs the frequency feature signal for training 1207 to the third DNN 1000 and the training apparatus 1300 (S1450).

The training apparatus 1300 compares the frequency feature signal for training 1203 output by the first DNN 400 in operation S1390 with the frequency feature signal for training 1207 output by the fourth DNN 1100, and thus, calculates the matching loss information 1290 (S1460).

The fourth DNN 1100 outputs the intermediate audio signal for training 1209 by processing the third training signal 1206 (S1470), and the third DNN 1000 outputs the weight signal for training 1208 by processing the frequency feature signal for training 1207 (S1480).

The training apparatus 1300 obtains the fourth training signal 1210 by combining the intermediate audio signal for training 1209 with the weight signal for training 1208, and obtains the up loss information 1280 by comparing the first training signal 1201 with the fourth training signal 1210 (S1490).

The second DNN 600, the third DNN 1000, and the fourth DNN 1100 update parameters according to final loss information obtained by combining at least one of the down loss information 1270, the up loss information 1280, and the matching loss information 1290 (S1492, S1494, and S1496).

The training apparatus 1300 may repeat operations S1320 to S1496 until the parameters of the first DNN 400, the DNN for training 1240, the second DNN 600, the third DNN 1000, and the fourth DNN 1100 are optimized.

FIGS. 12 to 14 illustrate a training procedure of a case where a frequency feature signal is embedded in the second audio signal 115, and a training procedure of a case where a frequency feature signal is not embedded in the second audio signal 115 will now be described with reference to FIGS. 15 to 17.

Figure 15:
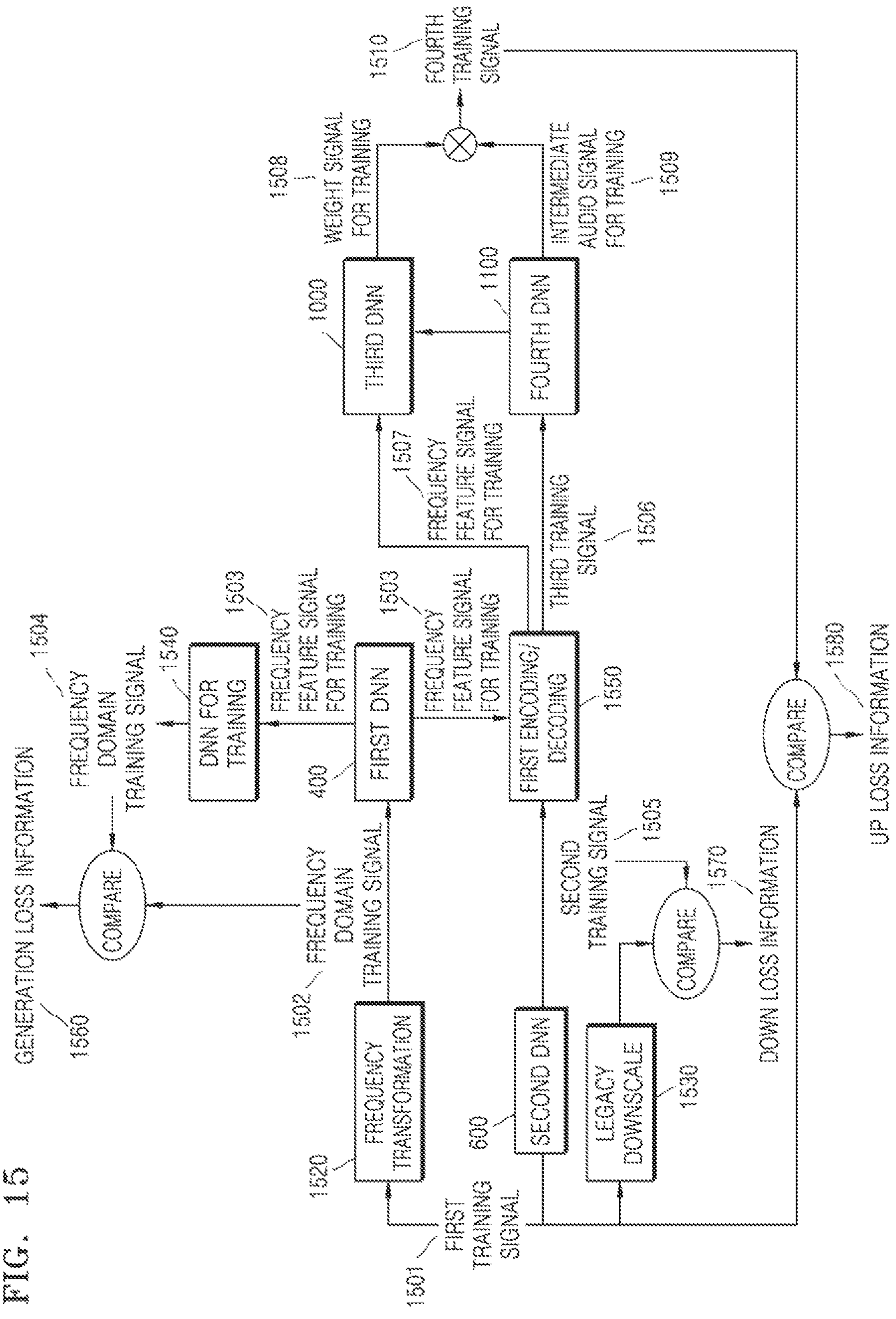
FIG. 15 illustrates another method of training a first DNN, a second DNN, a third DNN and a fourth DNN.

FIG. 15 illustrates another method of training the first DNN 400, the second DNN 600, the third DNN 1000, and the fourth DNN 1100.

In FIG. 15, a first training signal 1501 corresponds to the first audio signal 105, and a second training signal 1505 corresponds to the second audio signal 115. Also, a third training signal 1506 corresponds to the third audio signal 135, and a fourth training signal 1510 corresponds to the fourth audio signal 145.

A frequency domain training signal 1502 is obtained via a frequency transformation 1520 with respect to the first training signal 1501, and the frequency domain training signal 1502 is input to the first DNN 400. The first DNN 400 obtains a frequency feature signal for training 1503 by processing the frequency domain training signal 1502 according to a preset parameter.

The first training signal 1501 is input to the second DNN 600, and the second DNN 600 obtains the second training signal 1505 via the preset parameter.

The frequency feature signal for training 1503 and the second training signal 1505 are processed via first encoding and first decoding (1550). In more detail, audio data for training is obtained via first encoding with respect to the frequency feature signal for training 1503 and the second training signal 1505, and the third training signal 1506 and a frequency feature signal for training 1507 are obtained via first decoding with respect to the audio data for training. The frequency feature signal for training 1507 is input to the third DNN 1000, and the third training signal 1506 is input to the fourth DNN 1100. The third DNN 1000 obtains a weight signal for training 1508 by processing the frequency feature signal for training 1507 via the preset parameter.

The fourth DNN 1100 obtains an intermediate audio signal for training 1509 from the third training signal 1506 via the preset parameter. The fourth training signal 1510 is obtained by combining the weight signal for training 1508 with the intermediate audio signal for training 1509.

In FIG. 15, the frequency feature signal for training 1503 obtained by the first DNN 400 is input to a DNN for training 1540, and the DNN for training 1540 is a DNN for verifying whether the frequency feature signal for training 1503 is accurately generated by the first DNN 400. The DNN for training 1540 may have a mirror structure of the first DNN 400. The DNN for training 1540 reconstructs a frequency domain training signal 1504 by processing the frequency feature signal for training 1503.

Generation loss information ("Loss$_{DG}$") 1560 is obtained as a result of comparison between the frequency domain training signal 1502 obtained via the frequency transformation 1520 and the frequency domain training signal 1504 obtained by the DNN for training 1540. The generation loss information ("Loss$_{DG}$") 1560 may include at least one of a L1-norm value, a L2-norm value, a SSIM value, a PSNR-HVS value, a MS-SSIM value, a VIF value and a VMAF value between the frequency domain training signal 1502 obtained via the frequency transformation 1520 and the frequency domain training signal 1504 obtained by the DNN for training 1540. For example, the generation loss information 1560 may be expressed as Equation 1 described above.

The first training signal 1501 is changed to a sub-channel training signal via legacy downscale 1530, and down loss information ("Loss$_{Down}$") 1570 is obtained as a result of comparison between the sub-channel training signal and the second training signal 1505. The down loss information ("Loss$_{Down}$") 1570 may include at least one of a L1-norm value, a L2-norm value, a SSIM value, a PSNR-HVS value, a MS-SSIM value, a VIF value and a VMAF value between the sub-channel training signal and the second training signal 1505. For example, the down loss information 1570 may be expressed as Equation 2 described above.

According to a result of comparison between the first training signal 1501 and the fourth training signal 1510, up loss information ("Loss$_{Up}$") 1580 is obtained. The up loss information ("Loss$_{Up}$") 1580 may include at least one of a L1-norm value, a L2-norm value, a SSIM value, a PSNR-HVS value, a MS-SSIM value, a VIF value and a VMAF value between the first training signal 1501 and the fourth training signal 1510. For example, the up loss information 1580 may be expressed as Equation 3 described above.

Compared to the training procedure described in FIG. 12, in the training procedure of FIG. 15, the matching loss information ("Loss$_M$") 1290 is not obtained. It is because, in the training procedure of FIG. 15, the frequency feature signal for training 1503 is not embedded in the second training signal 1505, and a sameness between the frequency feature signal for training 1507 obtained via first decoding and the frequency feature signal for training 1503 obtained via the first DNN 400 is recognized.

The first DNN 400, the second DNN 600, the third DNN 1000, and the fourth DNN 1100 may each update a parameter to decrease or minimize final loss information obtained by combining at least one of the generation loss information 1560, the down loss information 1570, and the up loss information 1580.

In detail, the first DNN 400 and the DNN for training 1540 may update a parameter to decrease or minimize the generation loss information 1560. Also, the second DNN 600, the third DNN 1000, and the fourth DNN 1100 may each update a parameter to decrease or minimize the final loss information obtained as a result of the combination of the down loss information 1570 and the up loss information 1580.

Training of the first DNN 400 and the DNN for training 1540 may be expressed as Equation 5 described above, and training of the second DNN 600, the third DNN 1000, and the fourth DNN 1100 may be expressed as Equation 7 below.

$$\underset{\omega_{Phase2}}{\operatorname{argmin}}(\alpha \cdot Loss_{down} + (1-\alpha) \cdot Loss_{up}) \quad \text{[Equation 7]}$$

In Equation 7, $\omega_{Phase2}$ indicates a parameter set of the second DNN 600, the third DNN 1000, and the fourth DNN 1100, and a indicates a preset weight. The second DNN 600, the third DNN 1000, and the fourth DNN 1100 obtain the parameter set to minimize, via training, the final loss information obtained as a result of the combination of the down loss information ("Loss$_{Down}$") 1570 and the up loss information ("Loss$_{Up}$") 1580.

In an embodiment, training of the first DNN 400 and the DNN for training 1540 and training of the second DNN 600, the third DNN 1000, and the fourth DNN 1100 may be alternately performed. In more detail, the first DNN 400 and the DNN for training 1540 process an input signal according to an initially-set parameter, and then update the parameter according to the generation loss information 1560. Then, the first DNN 400 and the DNN for training 1540 process an input signal according to the updated parameter, and the second DNN 600, the third DNN 1000, and the fourth DNN 1100 process an input signal according to the initially-set parameter. The second DNN 600, the third DNN 1000, and the fourth DNN 1100 each update a parameter according to at least one of the up loss information 1580 and the down loss information 1570 obtained as a result of processing the input signal. When the updating of the parameter by the second DNN 600, the third DNN 1000, and the fourth DNN 1100 is completed, the first DNN 400 and the DNN for training 1540 update the parameter again.

Figure 16:
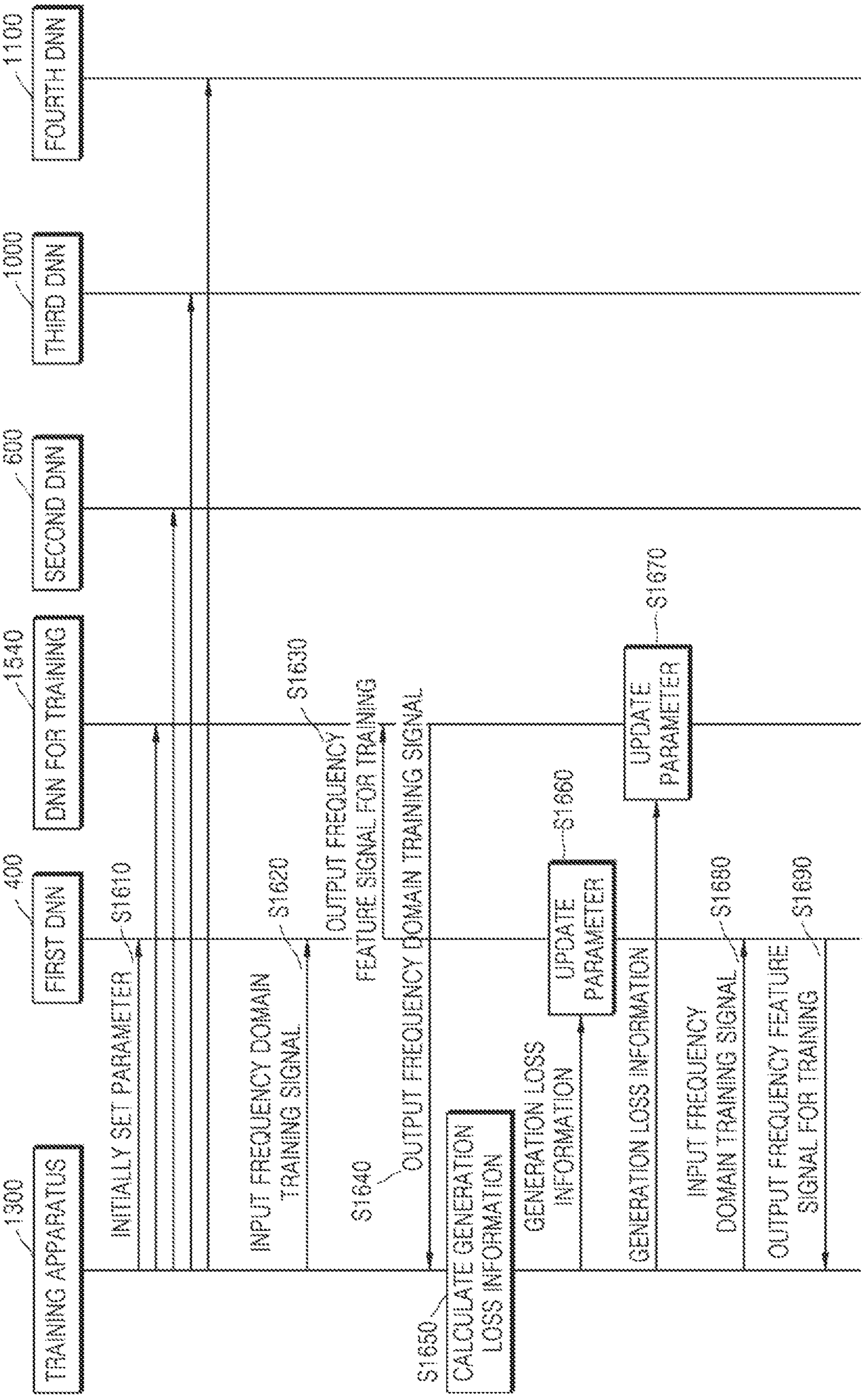
FIG. 16 illustrates a flowchart for describing another procedure for training, by a training apparatus, a first DNN, a second DNN, a third DNN, and a fourth DNN.
Figure 17:
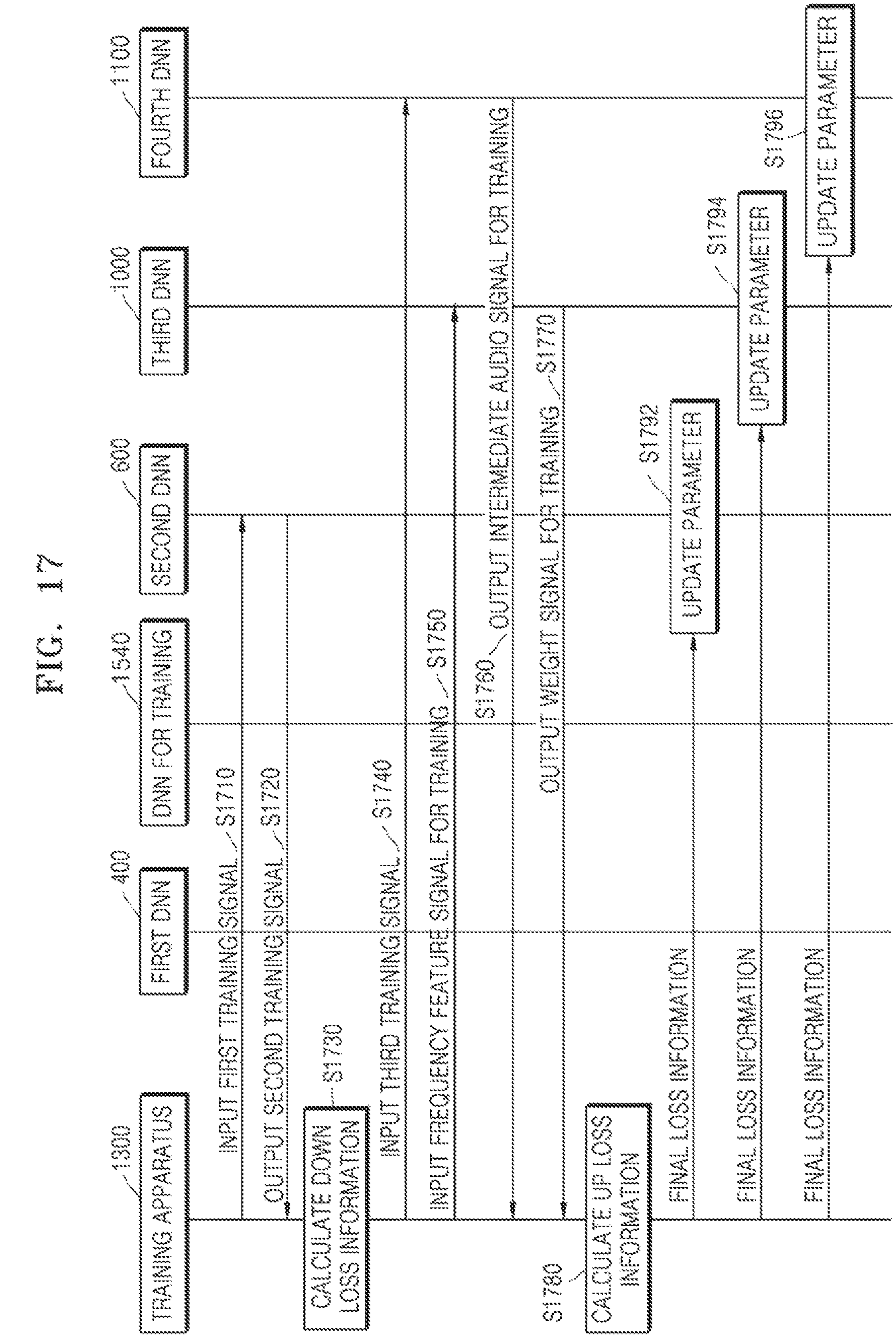
FIG. 17 illustrates a flowchart for describing another procedure for training, by a training apparatus, a first DNN, a second DNN, a third DNN and a fourth DNN.

FIGS. 16 and 17 illustrate flowcharts for describing a procedure for training, by the training apparatus 1300, the first DNN 400, the second DNN 600, the third DNN 1000, and the fourth DNN 1100.

Training of the first DNN 400, the DNN for training 1240, the second DNN 600, the third DNN 1000, and the fourth DNN 1100 (which is described with reference to FIG. 15) may be performed by the training apparatus 1300. The training apparatus 1300 may include the first DNN 400, the DNN for training 1540, the second DNN 600, the third DNN 1000, and the fourth DNN 1100. For example, the training apparatus 1300 may be the audio encoding apparatus 200 or a separate server. The third DNN 1000 and the fourth DNN 1100 obtained as a result of the training may be stored in the decoding apparatus 900.

Referring to FIG. 16, the training apparatus 1300 initially sets parameters of the first DNN 400, the DNN for training 1240, the second DNN 600, the third DNN 1000, and the fourth DNN 1100 (S1610).

The training apparatus 1300 inputs, to the first DNN 400, the frequency domain training signal 1502 obtained from the first training signal 1501 via the frequency transformation 1520 (S1620). The first DNN 400 outputs the frequency feature signal for training 1503 to the DNN for training 1540 (S1630), and the DNN for training 1540 outputs the reconstructed frequency domain training signal 1504 to the training apparatus 1300 (S1640).

The training apparatus 1300 compares the frequency domain training signal 1502 obtained via the frequency transformation 1520 with the frequency domain training signal 1504 output from the DNN for training 1540, and thus, calculates the generation loss information 1560 (S1650). Then, the first DNN 400 and the DNN for training 1540 each update a parameter according to the generation loss information 1560 (S1660 and S1670).

The training apparatus 1300 inputs the frequency domain training signal 1502 obtained from the first training signal 1501 via the frequency transformation 1520 back to the first DNN 400 (S1680). The first DNN 400 processes the frequency domain training signal 1502 via the updated parameter, and thus, outputs the frequency feature signal for training 1503 to the training apparatus 1300 (S1690). Compared to FIG. 13, the frequency feature signal for training 1503 is not embedded in the second training signal 1505, and thus, in FIG. 16, the frequency feature signal for training 1503 is not input to the second DNN 600.

Next, in FIG. 17, the training apparatus 1300 inputs the first training signal 1501 to the second DNN 600 (S1710), and the second DNN 600 outputs the second training signal 1505 to the training apparatus 1300 by processing the first training signal 1501 (S1720).

The training apparatus 1300 obtains the down loss information 1570 according to a result of comparison between the second training signal 1505 and a sub-channel training signal legacy downscaled from the first training signal 1501 (S1730).

The training apparatus 1300 inputs the third training signal 1506 and the frequency feature signal for training 1507 obtained via first encoding and first decoding to the fourth DNN 1100 and the third DNN 1000, respectively, (S1740 and S1750). The fourth DNN 1100 outputs the intermediate audio signal for training 1509 by processing the third training signal 1506 (S1760), and the third DNN 1000 outputs the weight signal for training 1508 by processing the frequency feature signal for training 1507 (S1770).

The training apparatus 1300 obtains the fourth training signal 1510 by combining the intermediate audio signal for training 1509 with the weight signal for training 1508, and obtains the up loss information 1580 by comparing the first training signal 1501 with the fourth training signal 1510 (S1780).

The second DNN 600, the third DNN 1000, and the fourth DNN 1100 update parameters according to final loss information obtained by combining at least one of the down loss information 1570 and the up loss information 1580 (S1792, S1794, and S1796).

The training apparatus 1300 may repeat operations S1620 to S1796 until the parameters of the first DNN 400, the DNN for training 1540, the second DNN 600, the third DNN 1000, and the fourth DNN 1100 are optimized.

Figure 18:
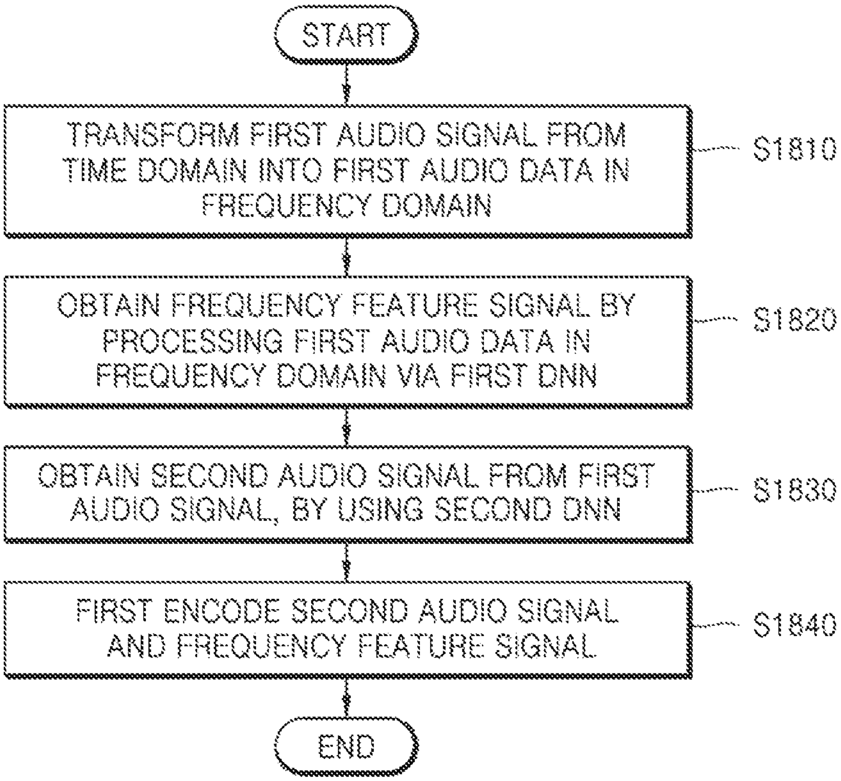
FIG. 18 illustrates a flowchart for describing an audio encoding method according to an embodiment.

FIG. 18 illustrates a flowchart for describing an audio encoding method according to an embodiment.

In S1810, the encoding apparatus 200 transforms the first audio signal 105 including n channels from a time domain into a frequency domain. As a result of the transformation, the first audio data in the frequency domain may have n channels.

In S1820, the encoding apparatus 200 processes the first audio data in the frequency domain via the first DNN 400, and thus, obtains a frequency feature signal whose number of samples per channel during a predetermined time period is smaller than the number of samples per channel of the first audio data in the frequency domain.

In S1830, the encoding apparatus 200 obtains the second audio signal 115 including m channels (where, m<n) from the first audio signal 105, by using the second DNN 600. A time length of the second audio signal 115 may be equal to a time length of the first audio signal 105, and the number of channels of the second audio signal 115 may be smaller than the number of channels of the first audio signal 105.

In S1840, the encoding apparatus 200 obtains audio data by first encoding the second audio signal 115 and the frequency feature signal. As described above, the frequency feature signal may be embedded in the second audio signal 115 and then may be first encoded, or each of the second audio signal 115 and the frequency feature signal may be first encoded and then included in the audio data.

Figure 19:
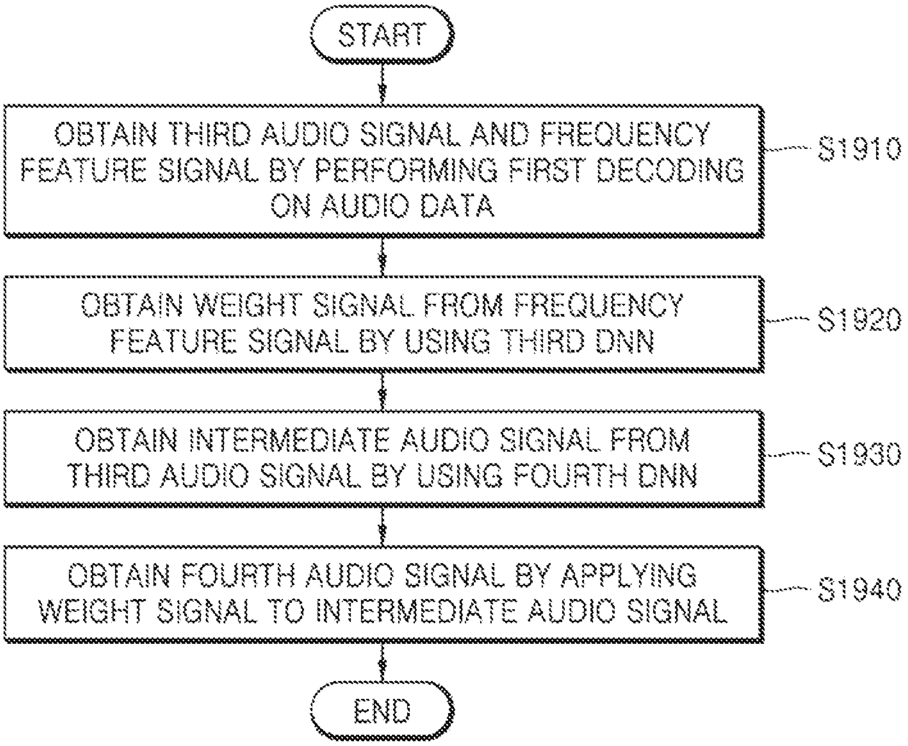
FIG. 19 illustrates a flowchart for describing an audio decoding method according to an embodiment.

FIG. 19 illustrates a flowchart for describing an audio decoding method according to an embodiment.

In S1910, the decoding apparatus 900 obtains the third audio signal 135 including m channels and a frequency feature signal by first decoding audio data. The frequency feature signal may be extracted during a processing procedure by the fourth DNN 1100 with respect to the third audio signal 135.

In operation S1920, the decoding apparatus 900 obtains a weight signal from the frequency feature signal by using the third DNN 1000. A time length and the number of channels of the weight signal may be equal to a time length and the number of channels of the first audio signal 105 and the fourth audio signal 145.

In S1930, the decoding apparatus 900 obtains an intermediate audio signal including n channels from the third audio signal 135 by using the fourth DNN 1100. A time length and the number of channels of the intermediate audio signal may be equal to a time length and the number of channels of the first audio signal 105 and the fourth audio signal 145.

In operation S1940, the decoding apparatus 900 obtains the fourth audio signal 145 including n channels, by applying a weight signal to the intermediate audio signal.

The fourth audio signal 145 may be output to a reproducing apparatus (e.g., speaker) to be reproduced.

The aforementioned embodiments of the disclosure may be written as computer-executable programs that may be stored in a medium.

The medium may continuously store the computer-executable programs, or may temporarily store the computer-executable programs for execution or downloading. Also, the medium may be any one of various recording media or storage media in which a single piece or plurality of pieces of hardware are combined, and the medium is not limited to a medium directly connected to a computer system, but may be distributed over a network. Examples of the medium include magnetic media, such as a hard disk, a floppy disk, and a magnetic tape, optical recording media, such as CD-ROM and DVD, magneto-optical media such as a floptical disk, and a read-only memory (ROM), a random access memory (RAM), and a flash memory, which are configured to store program instructions. Other examples of the medium include recording media and storage media managed by application stores distributing applications or by websites, servers, and the like supplying or distributing other various types of software.

While the technical concept of the disclosure is described with reference to exemplary embodiments, the disclosure is not limited to the embodiments, and various modifications and changes may be made by one of ordinary skill in the art without departing from the technical concept of the disclosure.

According to an embodiment, an audio signal processing apparatus may include: a memory storing one or more instructions; and a processor configured to execute the one or more instructions stored in the memory, wherein the processor is configured to frequency transform a first audio signal including n channels to generate a first audio signal of a frequency domain, generate a frequency feature signal for each channel from the first audio signal of the frequency domain, based on a first deep neural network (DNN), generate a second audio signal including m (where, m<n) channels from the first audio signal, based on a second DNN, and generate an output audio signal by encoding the second audio signal and the frequency feature signal, wherein the first audio signal is a high order ambisonic signal including a zero$^{th}$ order signal and a plurality of first order signals, and the second audio signal includes one of a mono signal and a stereo signal.

The frequency feature signal may include a representative value for each channel, and the representative value for each channel may be a value corresponding to a plurality of frequency bands for each channel of the first audio signal of the frequency domain.

The second DNN may obtain an audio feature signal from the first audio signal, and may output the second audio signal from an integrated feature signal in which the audio feature signal and the frequency feature signal are combined.

The integrated feature signal may be obtained by replacing samples of some channels from among channels of the audio feature signal with samples of the frequency feature signal.

The some channels may include a predetermined number of consecutive channels starting from a first channel or a predetermined number of consecutive channels starting from a last channel from among the channels of the audio feature signal.

A time length of the audio feature signal may be equal to a time length of the frequency feature signal.

The number of samples of each channel during a predetermined time period may be 1 in the frequency feature signal.

The output audio signal may be represented as a bitstream, and the frequency feature signal may be included in a supplemental region of the bitstream.

The processor may be configured to obtain the second audio signal by combining an intermediate audio signal output from the second DNN with a few-channel audio signal downscaled from the first audio signal.

The first DNN may be trained based on a result of comparing a frequency domain training signal transformed from a first training signal with a frequency domain training signal reconstructed from a frequency feature signal for training via a DNN for training, and the frequency feature signal for training may be obtained from the frequency domain training signal based on the first DNN.

The second DNN may be trained based on at least one of a result of comparing a second training signal obtained from the first training signal via the second DNN with a few-channel training signal downscaled from the first training signal, a result of comparing the first training signal with a fourth training signal reconstructed from audio data for training, and a result of comparing the frequency feature signal for training with a frequency feature signal for training obtained from the audio data for training.

The first DNN and the second DNN may be alternately trained.

According to another embodiment, an audio signal processing apparatus may include: a memory storing one or more instructions; and a processor configured to execute the one or more instructions stored in the memory, wherein the processor is configured to generate a third audio signal including m channels and a frequency feature signal by decoding an input audio signal, generate a weight signal including n (where, n>m) channels from the frequency feature signal, based on a third deep neural network (DNN), and generate a fourth audio signal including n channels by applying the weight signal to an intermediate audio signal including n channels generated from the third audio signal via a fourth DNN, wherein the third audio signal includes one of a mono signal and a stereo signal, and the fourth audio signal is a high order ambisonic signal including a zero$^{th}$ order signal and a plurality of first order signals.

The fourth DNN may obtain an integrated feature signal by processing the third audio signal, and outputs the intermediate audio signal from an audio feature signal included in the integrated feature signal, and the frequency feature signal may be extracted from the integrated feature signal and then is input to the third DNN.

The frequency feature signal may include a predetermined number of consecutive channels starting from a first channel or a predetermined number of consecutive channels starting from a last channel from among channels of the integrated feature signal.

The third DNN and the fourth DNN may respectively process the frequency feature signal and the audio feature signal, thereby outputting the weight signal and the intermediate audio signal having the same time length as a time length of the fourth audio signal.

The processor may be configured to obtain the fourth audio signal by multiplying samples of the intermediate audio signal by samples of the weight signal.

The third DNN and the fourth DNN may be trained based on at least one of a result of comparing a second training signal obtained from a first training signal via the second DNN with a few-channel training signal downscaled from the first training signal, a result of comparing the first training signal with a fourth training signal reconstructed from audio data for training via the third DNN and the fourth DNN, and a result of comparing a frequency feature signal for training obtained via the first DNN with a frequency feature signal for training obtained from the audio data for training via the fourth DNN.

According to another embodiment, an audio signal processing method may include: frequency transforming a first audio signal including n (where n is a natural number greater than 1) channels to generate a first audio signal of a frequency domain; generating a frequency feature signal for each channel from the first audio signal of the frequency domain, based on a first DNN; generate a second audio signal including m (where, m is a natural number smaller than n) channels from the first audio signal, based on a second DNN; and generate an output audio signal by encoding the second audio signal and the frequency feature signal, wherein the first audio signal is a high order ambisonic signal including a zero$^{th}$ order signal and a plurality of first order signals, and the second audio signal includes one of a mono signal and a stereo signal.

According to another embodiment, an audio signal processing method may include: generating a third audio signal including m channels and a frequency feature signal by decoding an input audio signal; generating a weight signal including n (where, n>m) channels from the frequency feature signal, based on a third deep neural network (DNN); and generating a fourth audio signal including n channels by applying the weight signal to an intermediate audio signal including n channels generated from the third audio signal via a fourth DNN, wherein the third audio signal includes one of a mono signal and a stereo signal, and the fourth audio signal is a high order ambisonic signal including a zero$^{th}$ order signal and a plurality of first order signals.

What is claimed is:

1. An audio signal processing apparatus comprising:

a memory storing one or more instructions; and a processor operatively connected to the memory and configured to execute the one or more instructions stored in the memory, wherein the processor is configured to:

transform a first audio signal comprising n channels to generate a first audio data in a frequency domain, wherein n is a natural number that is greater than one, generate a frequency feature signal for each channel of the n channels from the first audio data in the frequency domain, based on a first deep neural network (DNN), generate a second audio signal comprising m channels from the first audio signal, based on a second DNN, and generate an output audio signal by encoding the second audio signal and the frequency feature signal for each channel of the n channels, wherein the first audio signal is a high order ambisonic signal comprising a zero$^{th}$ order signal and a plurality of first order signals, wherein the second audio signal comprises a mono signal or a stereo signal, and wherein m is a natural number that is smaller than n.

2. The audio signal processing apparatus of claim 1, wherein the frequency feature signal for each channel of the n channels comprises a representative value for each channel, and wherein the representative value for each channel corresponds to a plurality of frequency bands for each channel of the first audio data in the frequency domain.

3. The audio signal processing apparatus of claim 1, wherein the second DNN obtains an audio feature signal from the first audio signal, and wherein the second DNN outputs the second audio signal from an integrated feature signal in which the audio feature signal and the frequency feature signal for each channel of the n channels are combined.

4. The audio signal processing apparatus of claim 3, wherein the integrated feature signal is obtained by replacing samples of channels of the audio feature signal with samples of the frequency feature signal for each channel of the n channels.

5. The audio signal processing apparatus of claim 4, wherein the channels comprise a predetermined number of consecutive channels starting from a first channel of the audio feature signal or a predetermined number of consecutive channels starting from a last channel of the audio feature signal.

6. The audio signal processing apparatus of claim 3, wherein a time length of the audio feature signal is equal to a time length of the frequency feature signal for each channel of the n channels.

7. The audio signal processing apparatus of claim 1, wherein a number of samples of each channel during a predetermined time period is one (1) in the frequency feature signal for each channel of the n channels.

8. The audio signal processing apparatus of claim 1, wherein the output audio signal is represented as a bitstream, and wherein a supplemental region of the bitstream comprises the frequency feature signal for each channel of the n channels.

9. The audio signal processing apparatus of claim 1, wherein the processor is configured to obtain the second audio signal by combining an intermediate audio signal output from the second DNN with a sub-channel audio signal downscaled from the first audio signal.

10. The audio signal processing apparatus of claim 1, wherein the first DNN is trained based on a result of comparing a first frequency domain training signal transformed from a first training signal with a second frequency domain training signal reconstructed from a frequency feature signal for training via a DNN for training, and wherein the frequency feature signal for training is obtained from the first frequency domain training signal based on the first DNN.

11. The audio signal processing apparatus of claim 10, wherein the second DNN is trained based on at least one of a result of comparing a second training signal obtained from the first training signal via the second DNN with a sub-channel training signal downscaled from the first training signal, wherein a result of comparing the first training signal with a fourth training signal is reconstructed from audio data for training, and wherein a result of comparing the frequency feature signal for training with a frequency feature signal for training is obtained from the audio data for training.

12. The audio signal processing apparatus of claim 11, wherein the first DNN and the second DNN are alternately trained.

13. An audio signal processing apparatus comprising:

a memory storing one or more instructions; and a processor operatively connected to the memory and configured to execute the one or more instructions stored in the memory, wherein the processor is configured to:

generate a third audio signal comprising m channels and a frequency feature signal by decoding an input audio signal, generate a weight signal comprising n channels from the frequency feature signal, based on a third deep neural network (DNN), and generate a fourth audio signal comprising n channels by applying the weight signal to an intermediate audio signal comprising n channels generated from the third audio signal via a fourth DNN, wherein the third audio signal comprises a mono signal or a stereo signal, wherein the fourth audio signal is a high order ambisonic signal comprising a zero$^{th}$ order signal and a plurality of first order signals, wherein n and m are natural numbers, and wherein n is greater than m.

14. The audio signal processing apparatus of claim 13, wherein the fourth DNN is configured to obtain an integrated feature signal by processing the third audio signal, and is configured to output the intermediate audio signal from an audio feature signal of the integrated feature signal, and wherein the frequency feature signal is extracted from the integrated feature signal and then is input to the third DNN.

15. The audio signal processing apparatus of claim 13, wherein the processor is further configured to obtain the fourth audio signal by multiplying samples of the intermediate audio signal by samples of the weight signal.

16. The audio signal processing apparatus of claim 13, wherein the fourth audio signal is output to a reproducing apparatus.

* * * * *